United States Patent
Duroe et al.

(10) Patent No.: US 12,214,511 B2
(45) Date of Patent: Feb. 4, 2025

(54) METHOD AND APPARATUS FOR BACK END CONTROL OF TRANSLATION AND ROTATION OF A GREEN WARE

(71) Applicant: CORNING INCORPORATED, Corning, NY (US)

(72) Inventors: John Christian Duroe, Big Flats, NY (US); Jeffrey Joe Stott, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 338 days.

(21) Appl. No.: 17/774,266

(22) PCT Filed: Nov. 20, 2020

(86) PCT No.: PCT/US2020/061413
§ 371 (c)(1),
(2) Date: May 4, 2022

(87) PCT Pub. No.: WO2021/108234
PCT Pub. Date: Jun. 3, 2021

(65) Prior Publication Data
US 2022/0388173 A1    Dec. 8, 2022

Related U.S. Application Data

(60) Provisional application No. 62/940,180, filed on Nov. 25, 2019.

(51) Int. Cl.
*B28B 11/24*    (2006.01)
*B25J 9/16*    (2006.01)
(Continued)

(52) U.S. Cl.
CPC ............. *B25J 9/1697* (2013.01); *B25J 13/08* (2013.01); *B25J 15/0071* (2013.01);
(Continued)

(58) Field of Classification Search
CPC ...... B25J 9/1697; B25J 13/08; B25J 15/0071; B28B 11/248; B28B 13/04; B28B 17/0072; B28B 3/269; B65G 47/901
(Continued)

(56) References Cited

U.S. PATENT DOCUMENTS

| | | | | |
|---|---|---|---|---|
| 4,319,840 A | * | 3/1982 | Kondo | G01N 21/95692 356/241.1 |
| 5,205,991 A | * | 4/1993 | Avery | B65G 51/03 264/211.13 |

(Continued)

FOREIGN PATENT DOCUMENTS

| | | |
|---|---|---|
| CN | 110000902 A | 7/2019 |
| EP | 1256427 A2 | 11/2002 |

(Continued)

OTHER PUBLICATIONS

James Reed, Principles of Ceramics Processing—Chapter 22, 1995, John Wiley & Sons, Inc.; pp. 418-449 (Year: 1995).*

(Continued)

*Primary Examiner* — Jaime Figueroa
(74) *Attorney, Agent, or Firm* — Kevin M. Able

(57) ABSTRACT

Disclosed herein is a method and apparatus for back end control of translation and rotation of green ware (e.g., producible from ceramic extrudate). A green ware handling system (102) includes a back end assembly (129) that contacts a back end face (118B) of a green ware (116) and moves to push the green ware (116) along the support channel (114). In certain embodiments, the green ware handling assembly (102) includes a leading end assembly (128) to pull the green ware (116) and then transfer control to the back end assembly (129), which translates and also optionally rotates the green ware (116). This handoff increases the overall production rate of the green ware (116). In certain embodiments, the back end assembly (129) pen- (Continued)

etrates the back end face (118B) of the green ware (116) with cleat penetration features (312) to provide a secure engagement with the green ware (116) to rotate and translate the green ware (116) while also decreasing a depth of damage to the green ware (116).

20 Claims, 21 Drawing Sheets

(51) Int. Cl.
| | |
|---|---|
| *B25J 13/08* | (2006.01) |
| *B25J 15/00* | (2006.01) |
| *B28B 13/04* | (2006.01) |
| *B28B 17/00* | (2006.01) |
| *B65G 47/90* | (2006.01) |
| *B28B 3/26* | (2006.01) |

(52) U.S. Cl.
CPC ............ *B28B 11/248* (2013.01); *B28B 13/04* (2013.01); *B28B 17/0072* (2013.01); *B28B 3/269* (2013.01)

(58) Field of Classification Search
USPC ................. 700/245–264; 318/568.11–568.25
See application file for complete search history.

(56) References Cited

U.S. PATENT DOCUMENTS

| | | | | | |
|---|---|---|---|---|---|
| 5,222,594 | A | * | 6/1993 | Sumino | B65G 39/16 198/807 |
| 5,591,387 | A | * | 1/1997 | Takeuchi | B28B 13/04 425/445 |
| 5,872,051 | A | * | 2/1999 | Fallon | H01L 23/49811 257/E21.511 |
| 6,165,885 | A | * | 12/2000 | Gaynes | H01L 23/49811 438/615 |
| 6,305,925 | B1 | * | 10/2001 | Cassani | B28B 3/022 425/432 |
| 6,800,229 | B2 | * | 10/2004 | Acerbi | B28B 13/0205 264/642 |
| 7,238,309 | B2 | | 7/2007 | Adriaansen et al. | |
| 7,267,536 | B2 | * | 9/2007 | Acerbi | B28B 13/04 425/371 |
| 7,438,546 | B2 | * | 10/2008 | Adriaansen | B29C 48/92 425/173 |
| 8,290,624 | B2 | * | 10/2012 | Hjornet | B65G 47/917 414/737 |
| 9,346,210 | B2 | * | 5/2016 | Robbins | B21C 29/04 |
| 2002/0167106 | A1 | * | 11/2002 | Acerbi | B28B 13/0205 264/109 |
| 2005/0031726 | A1 | * | 2/2005 | Acerbi | B28B 13/04 425/404 |
| 2011/0210473 | A1 | | 9/2011 | Duroe | |
| 2013/0243952 | A1 | * | 9/2013 | Mori | B05D 7/222 118/503 |
| 2015/0019013 | A1 | * | 1/2015 | Rose | B25J 13/08 702/41 |

FOREIGN PATENT DOCUMENTS

| | | |
|---|---|---|
| EP | 1375097 A2 | 1/2004 |
| EP | 2537655 A1 | 12/2012 |
| WO | 96/15888 A1 | 5/1996 |

OTHER PUBLICATIONS

International Search Report and Written Opinion of the International Searching Authority; PCT/US20/61413; Mailed Jun. 7, 2021; 18 Pages; European Patent Office.

Invitation to Pay Additional Fees of the International Searching Authority; PCT/US20/61413; Mailed Mar. 4, 2021; 11 Pages; European Patent Office.

\* cited by examiner

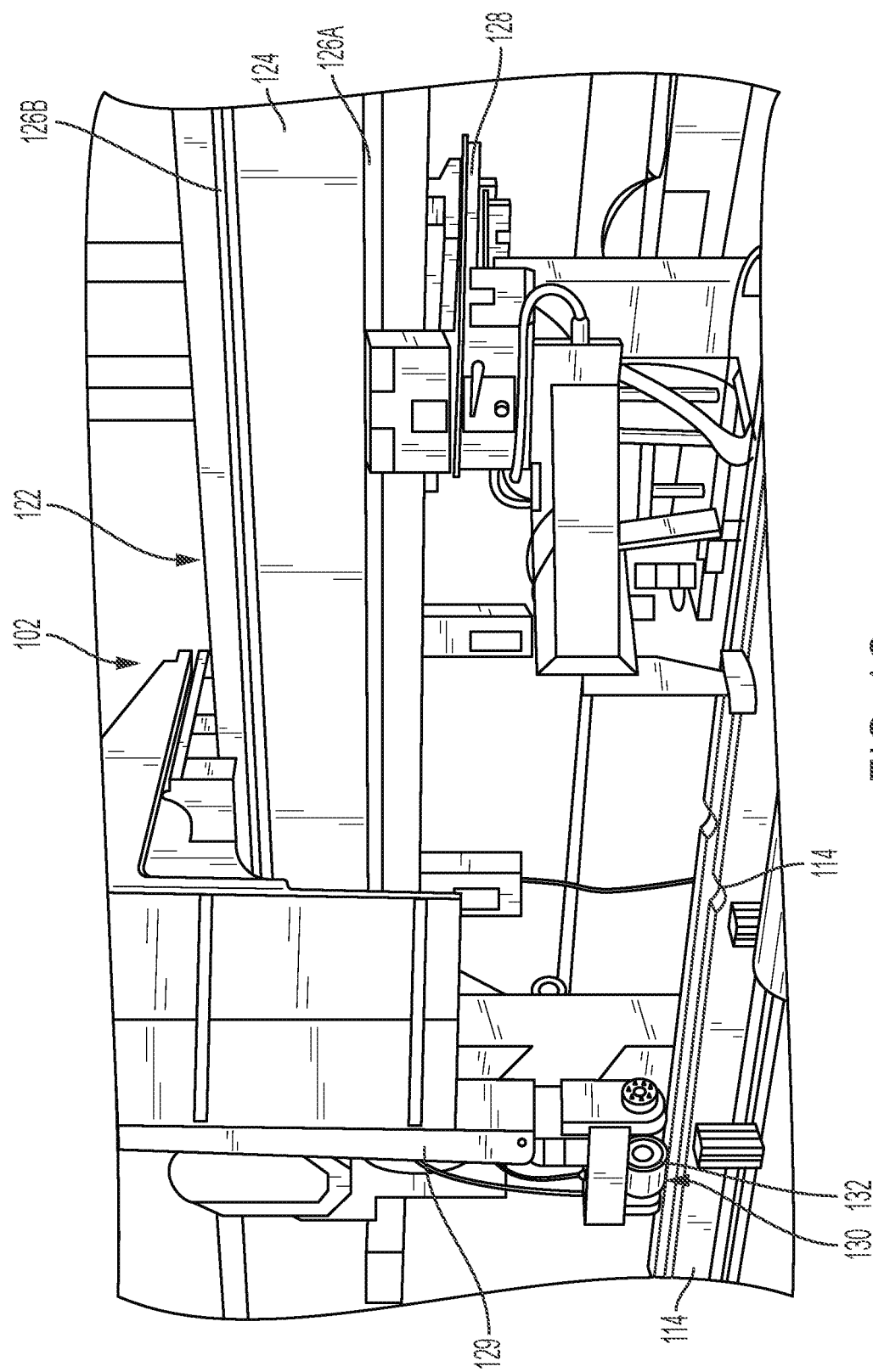

METHOD AND APPARATUS FOR BACK END CONTROL OF TRANSLATION AND ROTATION OF A GREEN WARE

CROSS REFERENCE TO RELATED APPLICATIONS

This is a national stage application under 35 U.S.C. § 371 of International Application No. PCT/US2020/061413, filed on Nov. 20, 2020, which claims the benefit of priority under 35 U.S.C § 120 of U.S. Provisional Application Ser. No. 62/940,180 filed on Nov. 25, 2019, the content of each of which is relied upon and incorporated herein by reference in its entirety.

BACKGROUND

The disclosure relates to green ware placement and transport, and more particularly to a method and apparatus for automatic loading and alignment of a green ware onto a tray.

Ceramic extruded products are used in a wide variety of applications, such as substrates for automotive exhaust catalytic converters, particulate traps within diesel and gasoline engines, chemical filtration processes, and the like.

SUMMARY

Disclosed herein is a method and apparatus for back end control of translation and rotation of green ware (e.g., producible from ceramic extrudate). In particular, disclosed is a green ware handling system including a back end assembly that contacts a back end face of a green ware and moves to push the green ware along the support channel. In certain embodiments, the green ware handling assembly includes a leading end assembly to pull the green ware from a leading end thereof after the green ware is cut. The leading end assembly transfers control to the back end assembly which pushes the green ware onto a dryer tray, while also optionally rotating the green ware. This handoff from the leading end assembly to the back end assembly increases the overall production rate of the green ware. In certain embodiments, the back end assembly penetrates the back end face of the green ware with penetration features to provide a secure engagement with the green ware to rotate and translate the green ware. In certain embodiments, the penetration features include cleats to increase rotational control of the green ware and decrease depth of damage to the green ware.

In one aspect, the present disclosure relates to a green ware handling system including a back end assembly configured to contact at least a portion of a back end face of a green ware and being moveable to push the green ware along a support channel.

In certain embodiments, the green ware handling system further includes a head end assembly configured to engage a leading end of the green ware and being movable to pull the green ware along the support channel. The green ware handling system is configured to, during translation of the green ware, transfer control of green ware motion from the head end assembly to the back end assembly. In certain embodiments, the head end assembly includes at least one fixed effector including a left fixed effector configured to engage a left side of the green ware and a right fixed effector configured to engage a right side of the green ware, the left fixed effector and the right fixed effector oriented toward one another. Each of the left fixed effector and the right fixed effector includes at least one pin configured to extend at least partially into the green ware.

In certain embodiments, the back end assembly includes a body and at least one rotational effector mounted thereto. The body is translatable along a track and is rotationally fixed relative to the track. The at least one rotational effector is rotationally movable relative to the body and configured to rotate the green ware around a central longitudinal axis of the green ware. In certain embodiments, the back end assembly includes a rotational effector configured to penetrate the back end face of the green ware, and, during translation of the green ware, the rotational effector is configured to rotate the green ware around a central longitudinal axis of the green ware. In certain embodiments, the rotational effector includes a leading surface and a plurality of penetration features extending forward of the leading surface to penetrate the back end face of the green ware. In certain embodiments, the plurality of penetration features includes penetration features that are circumferentially positioned around a center of the rotational effector, and that include at least one of cleats, pins, or blades. In certain embodiments, the plurality of penetration features includes cleats circumferentially positioned around the center of the rotational effector, with each cleat comprising a pyramid with a base, and each cleat oriented with one side of the base perpendicular to a radius extending from the center of the rotational effector.

In certain embodiments, the back end assembly further includes a body, at least one imaging device mounted to the body, and the rotational effector mounted to the body, with the rotational effector comprising a ring defining a center hole. The at least one imaging device is positioned behind the center hole to image the back end face of the green ware through the center hole as the at least one imaging device translates concurrently with the back end face of the green ware.

In certain embodiments, the green ware handling system further includes at least one imaging device configured to image the back face of the green ware, and generate, during translation of the green ware, at least one imaging output signal indicative of a rotational position of the end face of the green ware. The back end assembly is configured, during translation of the green ware, to rotate the green ware responsive to the at least one imaging output signal.

In certain embodiments, the back end assembly is configured to rotate the green ware to align a green ware web angle of the green ware to a predetermined web angle to vertically orient columns of an internal matrix of the green ware. In certain embodiments, the green ware handling system is configured to determine a difference between an average of a predetermined number of web angles to a desired target value, and generate additional input based on the difference for inclusion into a future web angle correction solution.

In another aspect, the present disclosure relates to a method of handling a green ware including pushing, by a back end assembly of a green ware handling system, a green ware in a direction substantially parallel to a central longitudinal axis of the green ware by contacting at least a portion of a back end face of the green ware.

In certain embodiments, the method further includes pulling, by a head end assembly of the green ware handling system, the green ware in the direction substantially parallel to the central longitudinal axis of the green ware by engaging a leading end of the green ware. In certain embodiments, the method further includes transferring control of motion of green ware from the head end assembly to the back end assembly during translation of the green ware.

In certain embodiments, the method further includes penetrating the back end face of the green ware with a plurality of penetration features of a rotational effector of the back end assembly. In certain embodiments, the method further includes rotating, by the back end assembly, the green ware around the central longitudinal axis of the green ware during translation of the green ware. In certain embodiments, the method further includes imaging the back end face of the green ware during translation of the green ware, electronically determining a web angle of the green ware, and electronically determining a rotational correction of the green ware. The rotating of the green ware is responsive to the determined rotational correction. In certain embodiments, the rotating of the green ware includes rotating the green ware to align the web angle of the green ware to a predetermined web angle to vertically orient columns of an internal matrix of the green ware. In certain embodiments, the method further includes determining, by the green ware handling system, a difference between an average of a predetermined number of web angles to a desired target value, and generating, by the green ware handling system, additional input based on the difference for inclusion into a future web angle correction solution.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1C is a perspective view of the green ware handling system of FIG. 1A.

DETAILED DESCRIPTION

Figure 1A:
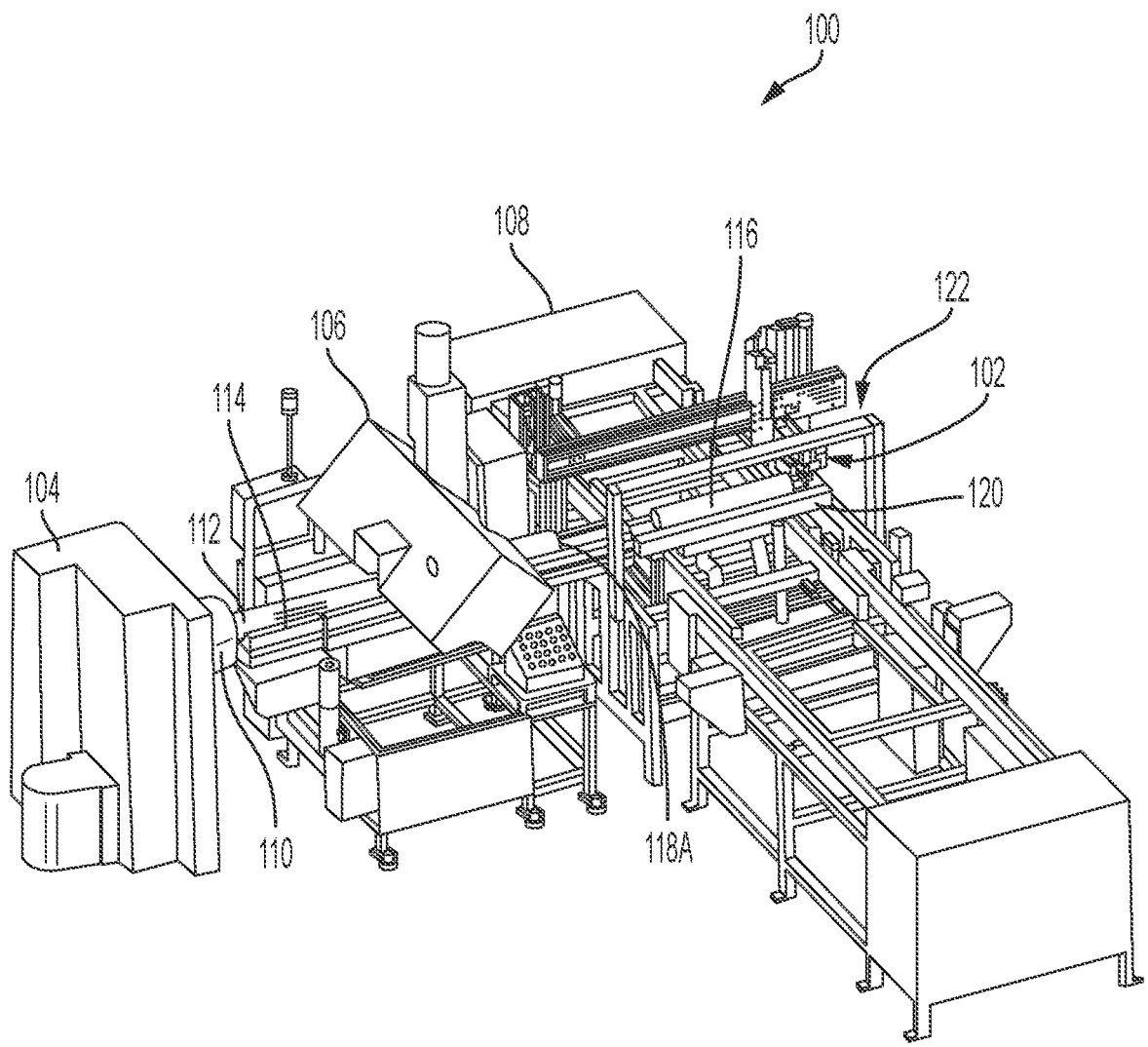
FIG. 1A is a perspective view of an extrusion system including a green ware handling system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The manufacturing process for ceramic extruded products can include transfer of green ware such as a cut portion of green ware (e.g., log, etc.) along a manufacturing line after ceramic batch material has been extruded from an extrusion die and shaped into extrudate (e.g., extrusion material) by the extrusion die. In particular, the manufacturing process can include transport of green ware onto a dryer tray for subsequent transportation to a dryer. Green ware may include a cylindrical outer wall with continuous internal cross-members. For example, in a rectangular celled green ware, the internal cross-members are arranged in perpendicularly arranged rows and columns to form a honeycomb-like matrix. In a hexagonal celled green ware, the internal cross-members form a hexagonal pattern. In certain applications, as the green ware is placed on the dryer tray, it is desirable to orient the honeycomb-like matrix such that the columns thereof are as close to vertical as possible in order to provide structural support for the outer wall and resist the potential negative effects of gravity (e.g., causing the green ware to slump or collapse). In certain applications, a piece of green ware may be pulled along to a dryer tray, for example by a head end assembly, which engages a leading end of the green ware to pull the green ware along a support channel to the dryer tray. While being pulled, the green ware may become automatically and/or manually rotated. Such a configuration may be limited in how quickly the green ware may be loaded and oriented onto the dryer tray by the speed of travel of the assembly pulling the green ware. In certain applications, the speed of translation of the green ware may be the limiting factor in the feed rate of the green ware and the overall production rate, and may be too slow for certain applications.

Disclosed herein is a method and apparatus for back end control of position (i.e., including translation and rotation) of a green ware (which may also be referred to herein as a log). A green ware handling system includes a back end assembly that contacts a back end face of a green ware and moves to push the green ware along the support channel. In certain embodiments, the green ware handling assembly includes a leading end assembly to pull the green ware from a leading end thereof after the green ware is cut. The leading end assembly transfers positional (e.g., translational and rotational) control to the back end assembly which pushes the green ware onto a dryer tray, while also optionally rotating the green ware. This handoff from the leading end assembly to the back end assembly increases the overall production rate of the green ware. In certain embodiments, the back end assembly penetrates the back end face of the green ware with penetration features to provide a secure engagement with the green ware to rotate and translate the green ware. In certain embodiments, the penetration features include cleats to increase rotational control of the green ware and decrease depth of damage to the green ware.

Figure 1B:
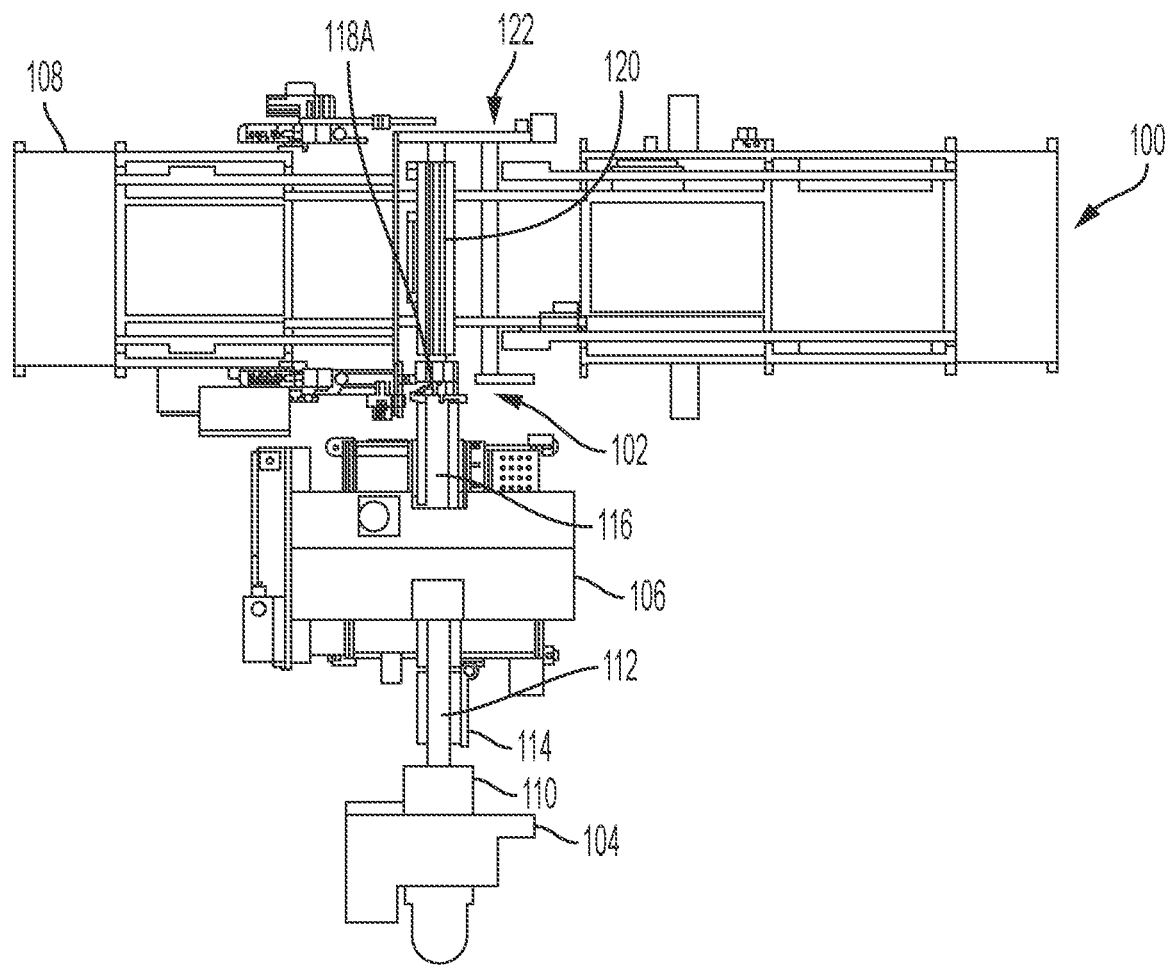
FIG. 1B is a top view of the extrusion system of FIG. 1A.

FIGS. 1A-1B are perspective views of an extrusion system 100 including a green ware handling system 102. The extrusion system 100 (which may also be referred to herein as a green ware transport apparatus) includes an extrusion apparatus 104 (which may also be referred to herein as an extruder), a saw assembly 106 (which may also be referred to herein as a saw), the green ware handling system 102, and a conveyor apparatus 108 (which may also be referred to as a conveyor).

The extrusion apparatus 104 has an extrusion die 110 configured to form an extrudate 112 (which may also be referred to as wet extrudate, extrudate material, etc.) onto a support channel 114. In certain embodiments, the extrudate 112 is a ceramic material. In certain embodiments, the extrudate 112 is a ceramic material and includes an aluminum titanate, a cordierite, a silicon carbide (SiC), a mullite, or any other suitable ceramic material.

The saw assembly 106 cuts a portion from the extrudate 112 to form a green ware 116 (which may also be referred to herein as a green ware, log, segment, wet green ware, etc.). In other words, the extrudate 112 is extruded onto the support channel 114, and then the extrudate 112 translates into a saw assembly 106, which cuts the extrudate 112 to form a green ware 116.

In certain embodiments, the green ware handling system 102 captures a leading end 118A of the extrudate 112 before the extrudate 112 is cut to form the green ware 116. In this way, the green ware handling system 102 engages and captures the leading end 118A of the extrudate 112 before any opportunity to deviate from an approximately vertical orientation (relative to gravity) as delivered from the extrusion apparatus 104 arises.

Once the green ware 116 is cut, the green ware handling system 102 transports the green ware 116 onto a dryer tray 120 while precisely maintaining a vertical orientation of a web angle of the green ware 116. The support channel 114 and/or the green ware handling system 102 include an air bearing surface over which the green ware 116 translates (e.g., linearly translates, curvilinearly translates, etc.). In this way, the green ware 116 translates along an air bearing path from the extrusion apparatus 104 to the dryer tray 120. When the green ware 116 is positioned on the dryer tray 120, the green ware 116 rests on the dryer tray 120. The green ware 116 in such an embodiment is wet (i.e., wet green ware). In certain embodiments, the wet green ware 116 will be dried to form dried green ware (which may still have some moisture content, but at least less moisture content than wet green ware). After drying, the dried green ware is fired into a ceramic in a kiln or furnace to form fired ware (which may also be referred to as ceramic ware, fired ceramic ware, etc.). It is noted that the green ware handling system 102 is illustrated and described as used with wet green ware 116, but could also be used with dried green ware.

Referring to FIG. 1C, the green ware handling system 102 includes a frame assembly 122 including a gantry 124 (which may also be referred to as a gantry drive system) with a first horizontal track 126A and a second horizontal track 126B. The horizontal tracks 126A, 126B are generally aligned (i.e., parallel to) the linear path of the green ware 116, the support channel 114, and/or the dryer tray 120. The green ware handling system 102 includes a head end assembly 128 mounted on and translatable relative to the first horizontal track 126A, a back end assembly 129 mounted on and translatable relative to the second horizontal track 126B, and an alignment system 130. The gantry 124 may include one or more linear actuators (e.g., servo motors) and gear assemblies to translate the head end assembly 128 and/or back end assembly 129 along the horizontal tracks 126A, 126B. The head end assembly 128 and the back end assembly 129 move simultaneously. To avoid interference of movement between the head end assembly 128 and the back end assembly 129, the first horizontal track 126A is located beneath the second horizontal track 126B. In other words, the head end assembly 128 is movably mounted to a bottom of the gantry 124 and the back end assembly is movably mounted to a top of the gantry 124.

The head end assembly 128 engages a leading end 118A of the green ware 116 and is movable to translate (e.g., pull) the green ware 116 from the saw assembly 106 along the support channel 114. The head end assembly 128 then transfers control of position of the green ware to the back end assembly 129, which translates the green ware 116 onto the dryer tray 120. The head end assembly 128 and the back end assembly 129 move simultaneously to increase the feed rate (and overall production rate). For example, in certain embodiments, the overall cycle time is at or better than a 6-second production rate. Further, in certain embodiments, the green ware handling system 102 reduces deviation from a targeted web angle to about +/−0.5 degrees. It is noted that the cycle time for the head end assembly 128 and the back end assembly 129 can be adjusted to accommodate various green ware lengths, extrusion velocities, and/or production cycle speeds, etc.

The head end assembly 128 pulls the green ware 116 from the saw assembly 106 to make a gap sufficiently large to enable positional control to be transferred to the back end assembly 129. The back end assembly 129 is configured to contact at least a portion of a back end face of the green ware 116 and is moveable to push the green ware 116 along the support channel 114. Further, in certain embodiments, the back end assembly 129 can rotate the green ware 116 90 degrees or more (e.g., 360 degrees). The green ware handling system 102 is configured to, during translation of the green ware 116, transfer positional control of green ware motion from the head end assembly 128 to the back end assembly 129. As a result, each of the head end assembly 128 and the back end assembly 129 travels less than the entire length of the support channel 114.

The alignment system 130 communicates with the back end assembly 129 to orient and rotationally adjust (i.e., rotationally reposition) the green ware 116 for precise vertical alignment of the green ware 116 as the green ware 116 is transported by the back end assembly 129 and placed from the support channel 114 onto the dryer tray 120. The alignment system 130 visually monitors the orientation of the green ware 116 and/or the dryer tray 120 to automatically precisely orient the web angle of the green ware 116 relative to gravity (e.g., to position internal columns of the green ware vertically). In particular, the alignment system 130 includes an imaging device 132 (which may be part of or separate from the back end assembly 129) and/or a tray sensor. The imaging device 132 is configured to image an end face of the green ware 116 and generate, during translation of the green ware 116, at least one imaging output signal indicative of a rotational position of an end face of the green ware 116. In certain embodiments, the imaging device 132 also images the end face of the green ware 116 after the green ware 116 is resting on the dryer tray 120 to provide feedback to the alignment system 130 and incorporate such feedback into future calculations in the placement of other green wares 116.

In certain embodiments, tray sensors may be provided to sense a tilt of the dryer tray 120 and generate at least one sensing output signal indicative of the tilt of the dryer tray 120. In such embodiments, the tray sensors are configured to measure the tilt (e.g., relative to gravity and/or relative to horizon, etc.) of the dryer tray 120 when in the loading position (as dryer trays 120 have variability among each other). Accordingly, the degree and direction of tilt of the dryer tray 120 is factored into the web angle correction by the back end assembly 129. Once the green ware 116 is positioned on the dryer tray 120, the conveyor apparatus 108 moves the dryer tray 120 to the dryer.

In this way, the extrusion system 100, and particularly the green ware handling system 102, provides positive positional (e.g., rotational) control of the green ware 116 and makes precise angular adjustments. Any variability of the dryer tray 120 and/or positioning of the dryer tray 120 in the loading position is measured and counteracted. Further, the extrusion system 100 is entirely automated, thereby eliminating any operator variability, reducing labor costs, and increasing production rate.

Figure 1D:
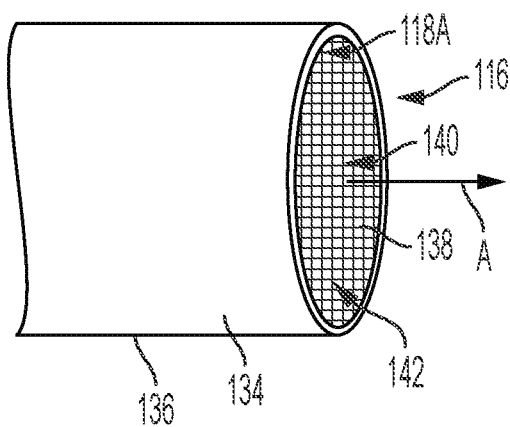
FIG. 1D is a perspective view of green ware formed from ceramic extrudate produced by the extrusion system of FIGS. 1A-1B.
Figure 1E:
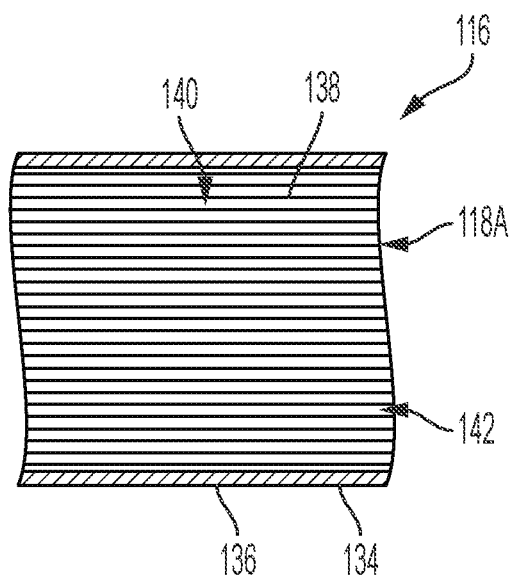
FIG. 1E is a cross-sectional side view of the green ware of FIG. 1D.
Figure 1F:
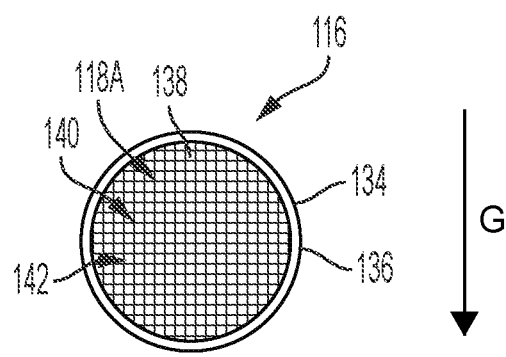
FIG. 1F is an end elevational view of the green ware of FIG. 1D illustrating a web angle of the green ware relative to gravity.

FIGS. 1D-1F are views of the green ware 116 formed from the extrusion system 100 of FIGS. 1A-1B. The green ware 116 has a leading end 118A (e.g., front end), as well as a peripheral wall 134 having an external surface 136 (i.e., skin) and a plurality of interior walls 138 (e.g., intersecting walls) that intersect within the peripheral wall 134. The interior walls 138 form mutually adjoining cell channels 140 that extend axially in direction "A" from the leading end 118A. Restated, in certain embodiments, the green ware 116 has a honeycomb cross-section 142 bounded by the peripheral wall 134. The green ware 116 may have a diameter of any size, including comparatively large sizes (e.g., diameters of 4 inches (101.6 mm), 6 inches (152.8 mm), or greater).

FIG. 1F is an end elevational view of the green ware 116 illustrating a web angle of the green ware 116 relative to gravity G. The internal columns of the interior walls 138 of the green ware relative to gravity G are vertically oriented. If however, the internal columns of the green ware were angled relative to gravity G, the green ware handling system 102 would rotate the green ware 116 to position the internal columns of the green ware vertically. The green ware handling system 102 is configured to rotate the green ware 116 to vertically orient columns of an internal matrix of the green ware 116 relative to gravity G and/or to align a web angle of the green ware 116 to a predetermined web angle relative to gravity G. Doing so prevents deformation and increases the quality of the final product.

Although the figures illustrate a honeycomb structure with square cells, other geometries could be used as well (e.g., hex, hex diagonals, etc.).

Figure 2:
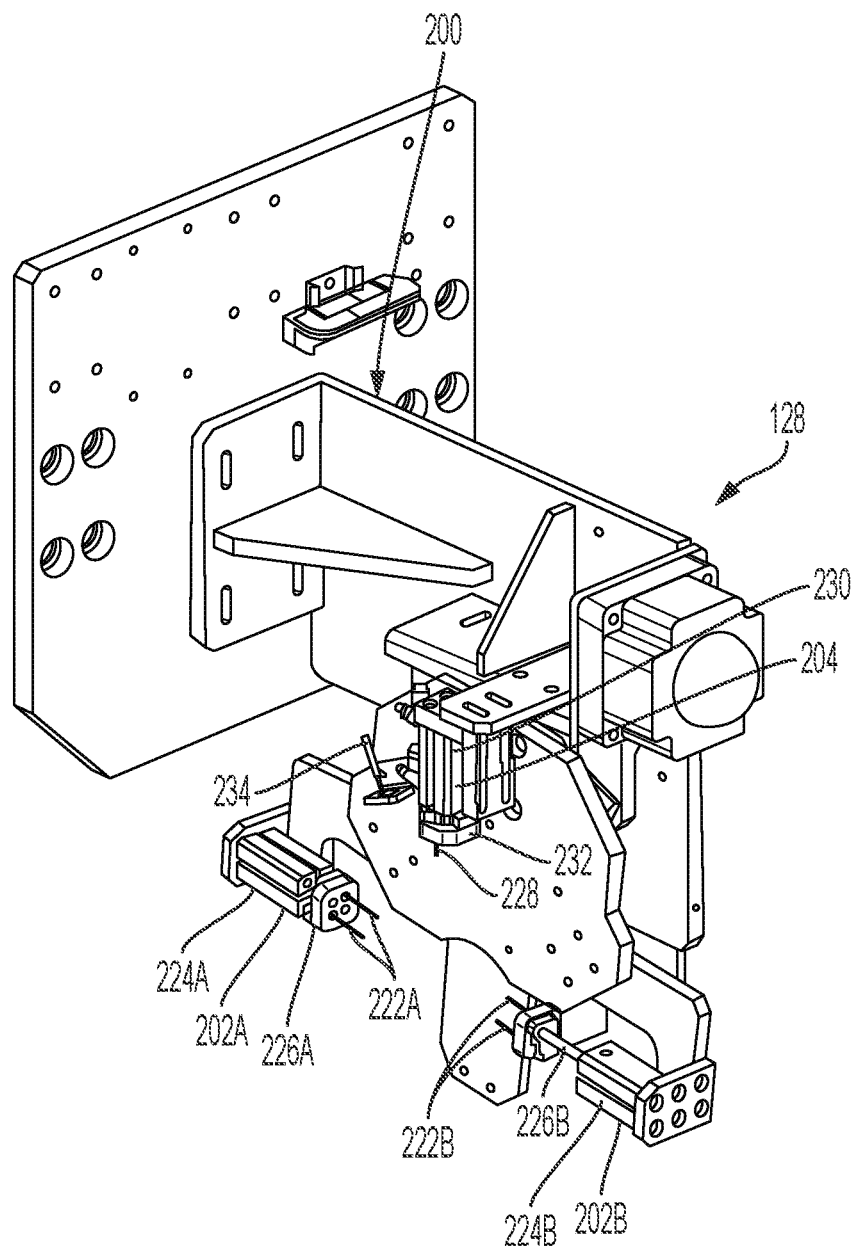
FIG. 2 is a perspective view of a head end assembly of the green ware handling system of FIGS. 1A-1C.

FIG. 2 is a perspective view of the head end assembly 128 of the green ware handling system of FIGS. 1A-1C. The head end assembly 128 includes a body 200, a left effector 202A, a right effector 202B, and a vertical effector 204. In certain embodiments, the left effector 202A, the right effector 202B, and/or the vertical effector 204 are fixed effectors. In certain embodiments, the left effector 202A and/or the right effector 202B are rotational effectors to rotate the green ware 116 while pulling the green ware 116.

The body 200 is linearly translatable along the first horizontal track 126A (see FIG. 1C) and rotationally fixed relative to the first horizontal track 126A. In certain embodiments, the left and right effectors 202A, 202B are rotationally movable relative to the body 200. Each of the left effector 202A, the right effector 202B, and the vertical effector 204 includes at least one pin that retracts and extends between a retracted position and an extended position. The at least one pin extends at least partially into the green ware 116.

For illustrative purposes, in FIG. 2, the left effector 202A is in the retracted position and the right effector 202B is in the extended position. The left effector 202A includes at least one side pin 222A that extends at least partially into the green ware 116. In particular, the left effector 202A includes a base 224A and an extendable arm 226A, with a plurality of side pins 222A attached to an end of the extendable arm 226A. The extendable arm 226A is extendable and retractable relative to the base 224A. In this way, movement of the extendable arm 226A from a retracted position to an extended position moves the plurality of side pins 222A into the green ware 116. Similarly, the right effector 202B includes a base 224B and an extendable arm 226B, with a plurality of side pins 222B attached to an end of the extendable arm 226B. The extendable arm 226B is extendable and retractable relative to the base 224B. In this way, movement of the extendable arm 226B from a retracted position to an extended position moves the plurality of side pins 222B into the green ware 116.

The left effector 202A and the right effector 202B are oriented toward one another. In other words, the left effector 202A and the right effector 202B are aligned with one another. The distance between the side pins 222A of the left effector 202A and the side pins 222B of the right effector 202B is greater when both are in the retracted position than when both are in the extended position. In this way, the left effector 202A is configured to engage a left side of the green ware 116 and the right effector 202B is configured to engage a right side of the green ware 116.

The vertical effector 204 is rotationally fixed relative to the body 200. The vertical effector 204 comprises one or more top pins 228 configured to extend at least partially into the green ware 116. In particular, the vertical effector 204 includes a base 230 and an extendable arm 232 with a plurality of top pins 228 attached to an end of the extendable arm 232. In this way, movement of the extendable arm 232 from a retracted position to an extended position moves the plurality of top pins 228 into a top of the green ware 116. The vertical effector 204 is configured to vertically engage the green ware 116. There could be a tendency for the green ware 116 to roll as the first and second side pins 222A, 222B are retracted. The top pins 228 remain vertical. Accordingly, once inserted into the green ware 116, the top pins 228 allow the first and second side pins 222A, 222B to be retracted without causing a disturbance to the web angle orientation of the green ware 116. The top pins 228 can be retracted or the green ware 116 can fall off the top pins 228 vertically without affecting the web angle of the green ware 116.

The head end assembly 128 is configured to translate the green ware 116 along the central longitudinal axis after engagement of the left effector 202A, the right effector 202B, and/or the vertical effector 204 with the green ware 116. The head end assembly 128 further includes a sensor 234 configured to identify the leading end 118A of the extrudate 112 for determining when the left effector 202A, the right effector 202B, and/or the vertical effector 204 of the head end assembly 128 should extend and engage the extrudate 112.

Figure 3A:
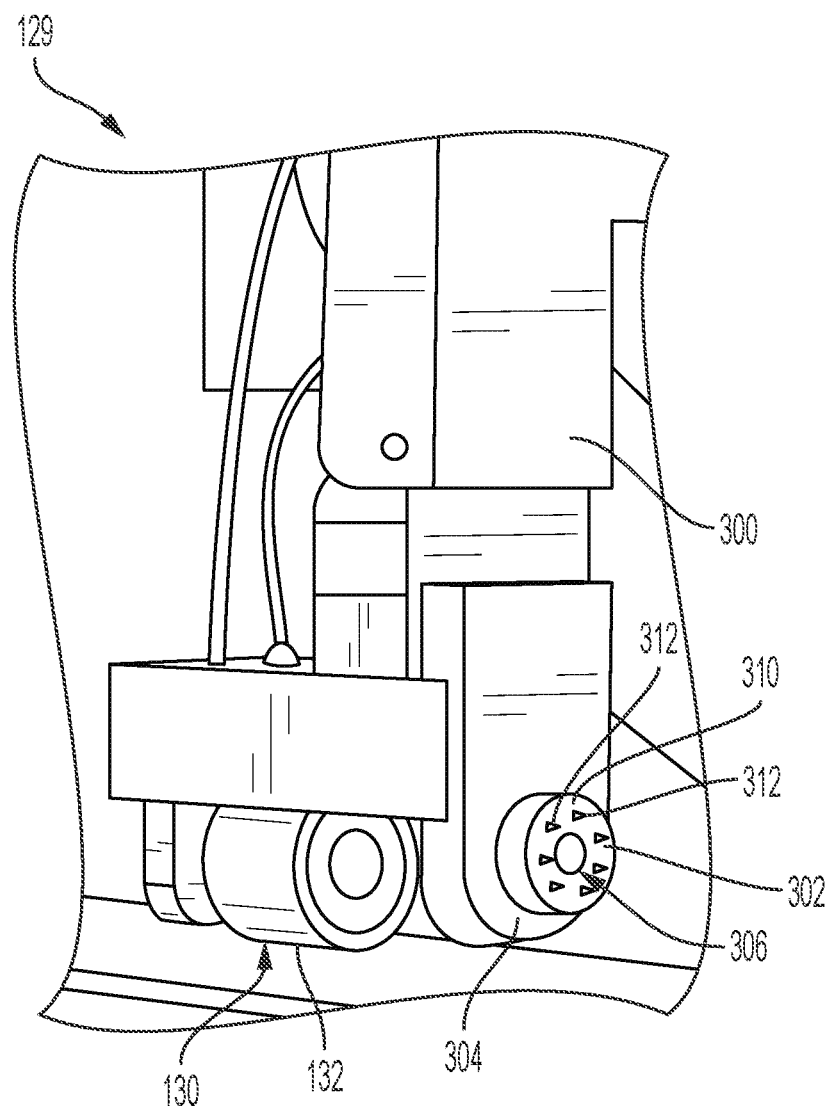
FIG. 3A is a perspective view of a back end assembly of the green ware handling system of FIGS. 1A-1C.

FIG. 3A is a perspective view of the back end assembly 129 of the green ware handling system 102 of FIGS. 1A-1C. The back end assembly 129 includes a body 300 and at least one rotational effector 302 mounted thereto. The body 300 is translatable along the second horizontal track 126B and is rotationally fixed relative to the second horizontal track 126B. The at least one rotational effector 302 is rotationally movable relative to the body 200 and configured to rotate the green ware 116 around a central longitudinal axis of the green ware 116. The body 300 moves along the second horizontal track 126B towards the end of the green ware 116 until the rotational effector 302 contacts the end of the green ware 116. Accordingly, the rotational effector 302 penetrates (e.g., punctures, indents, etc.) the end of the green ware 116 and, after penetration, as the body 300 of the back end assembly 129 continues to move along the second horizontal track 126B, the rotational effector 302 of the back end assembly 129 pushes the green ware 116.

The rotational effector 302 is configured to penetrate the back end face of the green ware 116, and, during translation of the green ware 116, is configured to rotate the green ware 116 around a central longitudinal axis of the green ware 116. In certain embodiments, the rotational effector 302 of the back end assembly 129 rotates the green ware 116 responsive to the at least one imaging output signal of the imaging device 132 and/or at least one sensing output signal of the tray sensors. The rotational effector 302 is configured to rotate the green ware 116 to vertically orient columns of an internal matrix of the green ware 116 relative to gravity and/or to align a web angle of the green ware 116 to a predetermined web angle relative to gravity (e.g., to vertically orient columns of an internal matrix of the green ware 116). Insertion of penetration features (embodied as cleats 312) of the rotational effector 302 into the back end of the green ware 116 provides the positive control necessary to accurately evaluate and correct the web angle of the green ware 116. It is noted that, unlike other configurations, the rotational effector 302 controlling and penetrating a back end face of the green ware 116 allows for 360 degree rotation of the green ware 116, if needed. For example, in certain embodiments, the rotational effector 302 may be rotated (e.g., rolled) 90 degrees or more, such as to orient the green ware 116 on the dryer tray 120 to optimize downstream processes.

In certain embodiments, the back end assembly 129 includes the imaging device 132. In other embodiments, the imaging device 132 is separate from the back end assembly 129. In certain embodiments, the imaging device 132 is mounted to the body 300. The rotational effector includes a ring 304 defining a center hole 306. The ring 304 includes a leading surface 310 and a plurality of penetration features (e.g., 4-36 penetration features) circumferentially positioned around a center of the rotational effector 302.

The imaging device 132 is positioned behind the center hole 306 to image the back end face of the green ware 116 through the center hole 306 as the imaging device 132 translates concurrently with the back end face of the green ware 116. Accordingly, in such a configuration, the imaging device 132 is configured to translate concurrently with the end face of the green ware 116. The imaging device 132 is configured to image an end face of the green ware, and generate, during translation of the green ware 116, at least one imaging output signal indicative of a rotational position of an end face of the green ware 116. In certain embodiments, the imaging device 132 may include at least one of a leveling device, a gimbal, and/or a gyroscope.

Figure 3B:
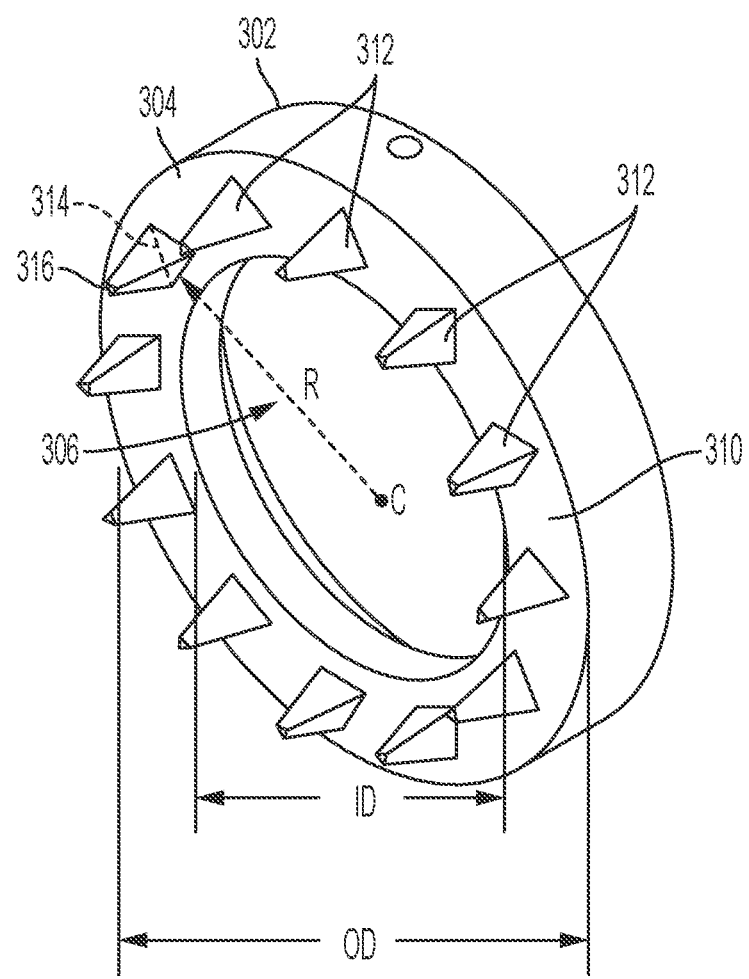
FIG. 3B is a perspective view of a rotational effector of the back end assembly of FIG. 3A, including a plurality of penetration features embodied as cleats.

FIG. 3B is a perspective view of the rotational effector 302 of the back end assembly 129 of FIG. 3A, including a plurality of penetration features (e.g., protrusions) embodied as cleats 312, as noted above. The ring includes an outer diameter (OD) and an inner diameter (ID) defining the center hole 306. In certain embodiments, the OD may be between 2.25 and 10 inches, and the ID may be between 1.25 and 9.5 inches, such as for parts between 2.5 and 20 inches in diameter. For smaller tools, the OD may be between 2.25 and 3 inches, and the ID may be between 1.25 and 1.75 inches, such as for parts between 2.5 and 9 inches in diameter. For larger tools, the OD may be between 5.75 and 10 inches, and the ID may be between 5 and 9.5 inches, such as for parts between 6 and 20 inches in diameter. In certain embodiments, the depth of penetration of the penetration features into the green ware 116 is between 0.25 and 0.75 inches.

As noted above, the plurality of cleats 312 extend forward (e.g., protrude) from the leading surface 310 to penetrate the back end face of the green ware 116 while the leading surface 310 is generally smooth to push the back end face of the green ware 116. The plurality of cleats 312 are distributed circumferentially around a center of a face of the rotational effector 302 to provide several points of engagement, thereby decreasing the force exerted on any one point of the back end face of the green ware 116 while the back end assembly 129 rotates the green ware 116.

Each cleat 312 includes a pyramid with a base 314. In certain embodiments, the cleat 312 includes a frustoconical top 316 to reduce risk of injury to users that may be handling the rotational effector 302 or otherwise next to the back end assembly 129 (e.g., during use). Each cleat 312 is oriented with one side of the base perpendicular to a radius R extending from the center C of the rotational effector 302. In such a configuration, the vertex of the base 314 of the pyramid cuts into the green ware 116 less during rotation of the rotational effector 302, at least compared to other orientations. In certain embodiments, the cleats 312 have a base of about 0.03613 square inches, a tip of about 0.002 square inches, and/or a 10-15 degree taper.

Figure 3C:
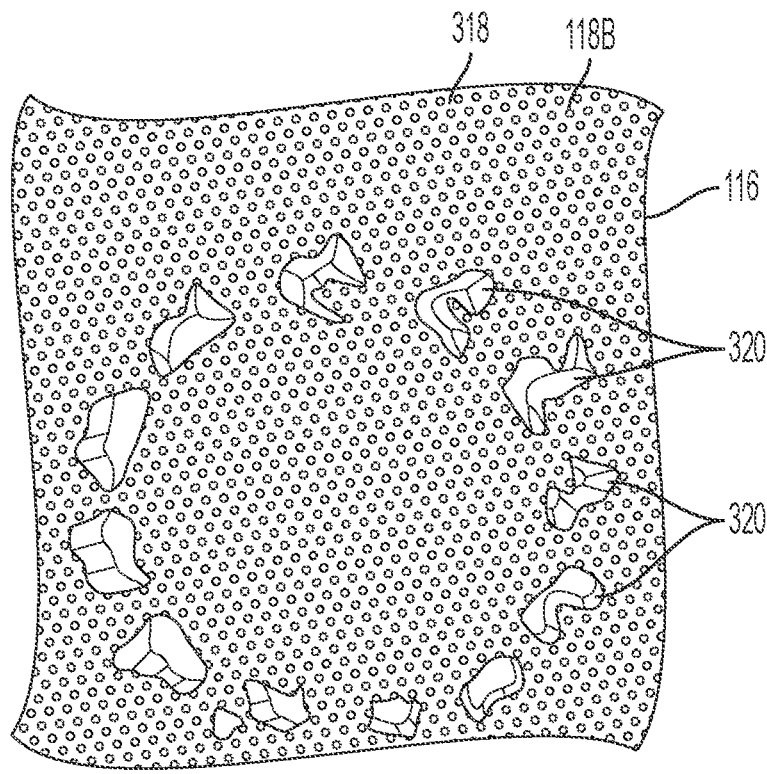
FIG. 3C is a magnified elevational view of a portion of a back end face of a green ware, illustrating effects of engagement with the rotational effector of FIG. 3B.

FIG. 3C is a magnified elevational view of a portion of a back end face 318 of a green ware 116 (at a back end 118B) illustrating effects of engagement with the rotational effector 302 of FIG. 3B. As noted above, the rotational effector 302 penetrates the back end of the green ware 116, which causes punctures 320 (e.g., indentations) in the back end face 318 of the green ware 116. The portion of the green ware 116 proximate the back end face 318 can be cut to remove the portion of the green ware 116 damaged by the penetration features 312.

Figure 3D:
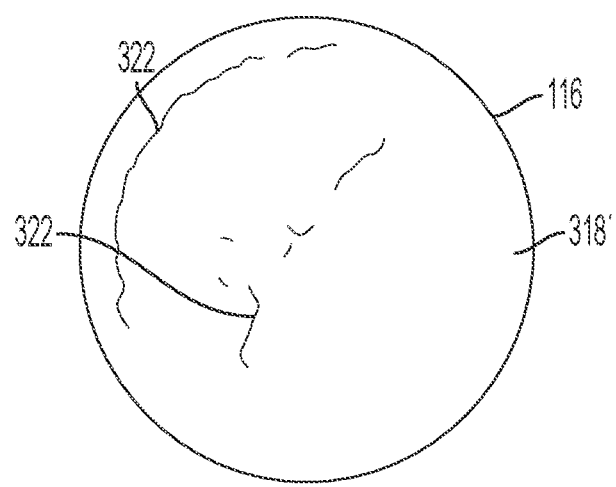
FIG. 3D is a elevational view of a back end of a green ware, illustrating the extent and depth of damage to the green ware from engagement with the rotational effector of FIG. 3B.

FIG. 3D is an elevational view of a sectioned back end face 318' of a green ware 116, illustrating extent and depth of damage to the green ware 116 from engagement with the rotational effector 302 of FIG. 3B. Illustrated is the green ware 116 after 0.5 inches were removed from the back end face 318 of the green ware 116 to expose the sectioned back end face 318'. As shown, the green ware 116 includes cracks 322 at a depth of 0.5 inches from the back end face 318. In certain embodiments, a certain number of green wares 116 subjected to engagement and rotation by the rotational effector 302 may experience a depth of damage beyond penetration of the penetration features 312. The cleats 312 can be dimensioned, designed, and otherwise configured (by orientation of the cleats 312) to limit the depth of damage imparted to green wares.

Figure 4:
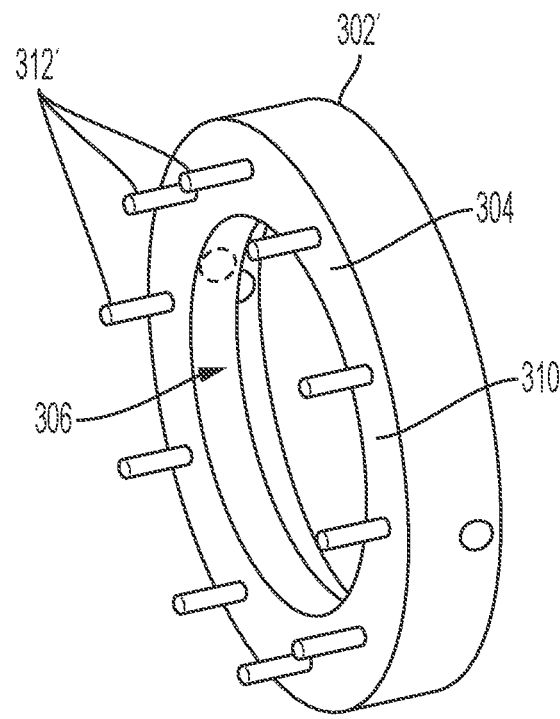
FIG. 4 is a perspective view of a first rotational effector useable with the back end assembly of FIGS. 3A-3B, including a plurality of penetration features embodied as pins.

FIG. 4 is a perspective view of a rotational effector 302' of the back end assembly 129 of FIG. 3A, including a plurality of penetration features embodied as pins 312'. In certain embodiments, the pins 312' have a base of about 0.007 square inches, and a tip with a rounded end.

Figure 5:
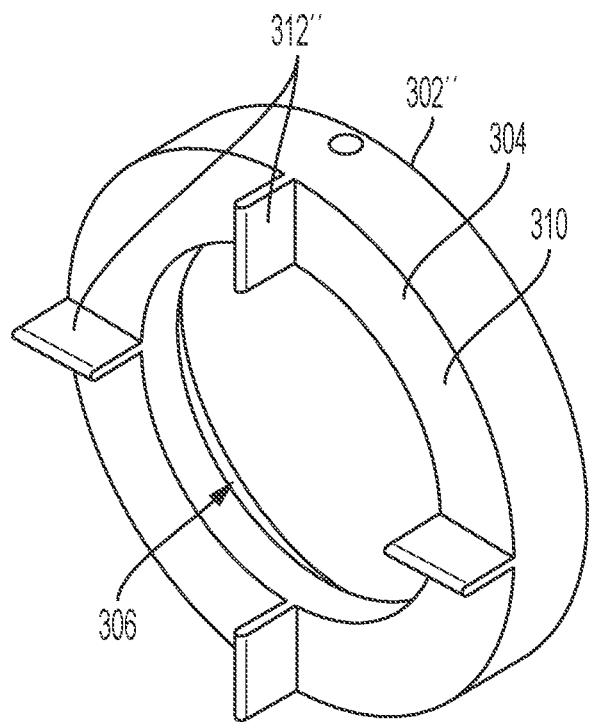
FIG. 5 is a perspective view of a second rotational effector useable with the back end assembly of FIGS. 3A-3B, including a plurality of penetration features embodied as blades.

FIG. 5 is a perspective view of a rotational effector 302" of the back end assembly 129 of FIG. 3A, including a plurality of penetration features embodied as blades 312". In certain embodiments, the blades 312" have a base of about 0.03 square inches, a tip of about 0.005 square inches, and/or a 45-60 degree taper. It is noted that the blades 312" reduce the damage to the back end face 318 compared to other penetration features. Blades 312" may be preferred for softer product compositions of the green ware 116.

Various types of penetration features of the rotational effector 302 may be used depending on the application and/or needs. For example, in evaluating various types of penetration features, factors that may be considered are average web angle accuracy, average depth of damage, percentage of face cracks, percentage of internal cracks, and/or face damage, etc. In comparing the performance of the cleats 312, the pins 312', and the blades 312", some experimental results are as follows: use of the cleats 312 achieved an average web angle of 8.23 degrees and an average depth of damage of 0.67 inches, with 35% faces damaged; use of the pins 312' achieved an average web angle of 11.24 degrees and an average depth of damage of 0.66 inches, with 40% of faces damaged; and use of the blades 312" achieved an average web angle of 14.12 degrees and an average depth of damage of 0.88 inches, with 70% faces damaged. Accordingly, in this experiment, the cleats 312 provided the most accurate web angle placement with the least damage to the back end face 318 of the green ware 116. In certain embodiments, the depth of damage is less than 0.5 inches.

Figure 6A:
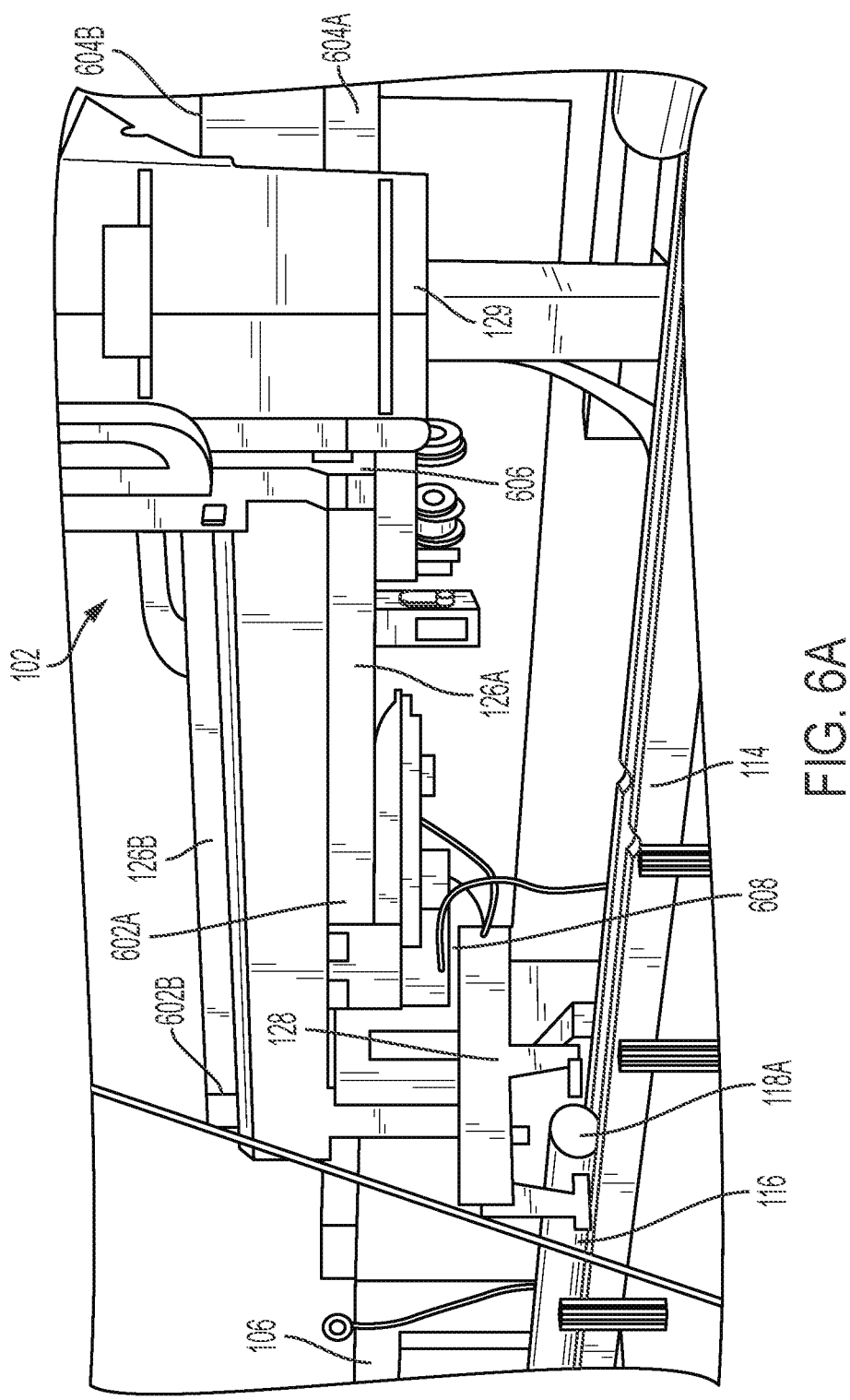
FIG. 6A is a perspective view of a head end assembly of FIG. 2 controlling position of the green ware, with the head end assembly engaged with a leading end of the green ware at an initial travel position and the back end assembly disengaged from the green ware at an end travel position.
Figure 6B:
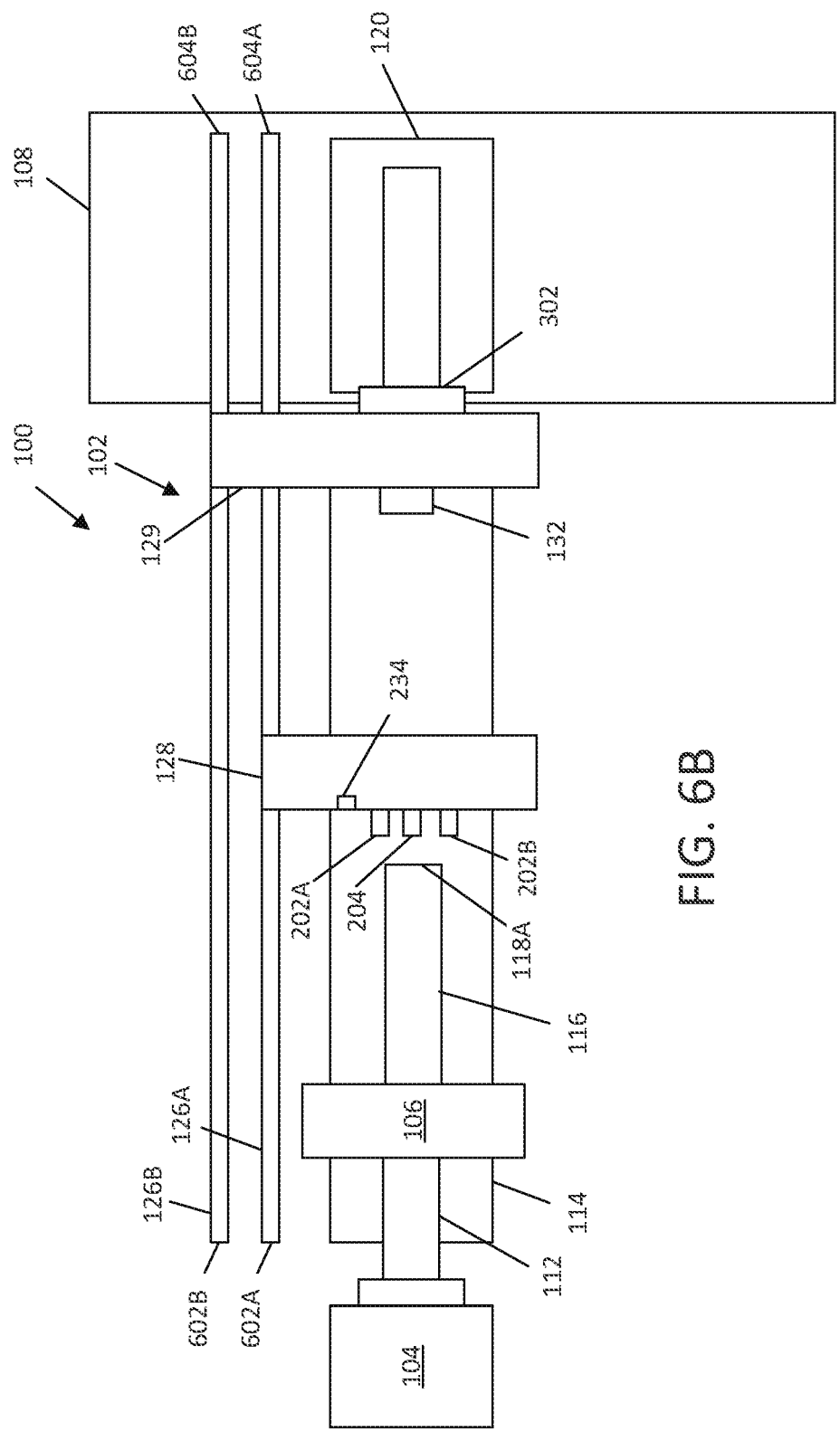
FIG. 6B is a simplified schematic illustrating the features of FIG. 6A.

FIGS. 6A-6H are perspective views illustrating transfer of a green ware 116 between the head end assembly 128 of the green ware handling system 102 and the back end assembly 129 of the green ware handling system 102. Referring to FIG. 6A, as the green ware 116 is formed from and exits the saw assembly 106, the head end assembly 128 of the green ware handling system 102 engages and controls position (e.g., translation and rotation) the green ware 116. FIG. 6B is a simplified schematic illustrating the features of FIG. 6A.

The head end assembly 128 engages a leading end 118A of the green ware 116 at an initial travel position proximate a first end 602A of the first horizontal track 126A. In certain embodiments, the head end assembly 128 engages the extrudate 112 before the green ware 116 is cut and formed by cutting the extrudate 112. In certain embodiments, as the head end assembly 128 approaches the leading end 118A of the green ware 116, the sensor 234 determines the leading end 118A of the green ware 116 (before the leading end 118A of the extrudate 112 contacts the head end assembly 128). The saw assembly 106 then cuts the extrudate 112, and the head end assembly 128 translates the green ware 116 towards the second end 602B of the first horizontal track 126A. Upon determining the leading end 118A of the extrudate 112, the extendable arms 226A, 226B of the left and right effectors 202A, 202B move from a retracted position to an extended position so that the side pins 222A, 222B of the left and right effectors 202A, 202B engage (e.g., insert into) the left and right sides, respectively, of the extrudate 112. In certain embodiments, the vertical effector 204 engages a top of the extrudate 112. In certain embodiments, once the left and right effectors 202A, 202B engage the extrudate 112, the extrudate 112 is cut by the saw assembly 106 (see FIGS. 1A-1B).

The back end assembly 129 is disengaged from the green ware 116 at an end travel position proximate a second end 604B of the second horizontal track 126B. Further, the back end assembly 129 is in an elevated position for the back end assembly 129 to move past the head end assembly 128 and avoid collision therewith. The back end assembly 129 is vertically movable by retraction and extension of back end arm 606. In other words, the head end assembly 128 is positioned between the saw assembly 106 and the back end assembly 129.

Figure 6C:
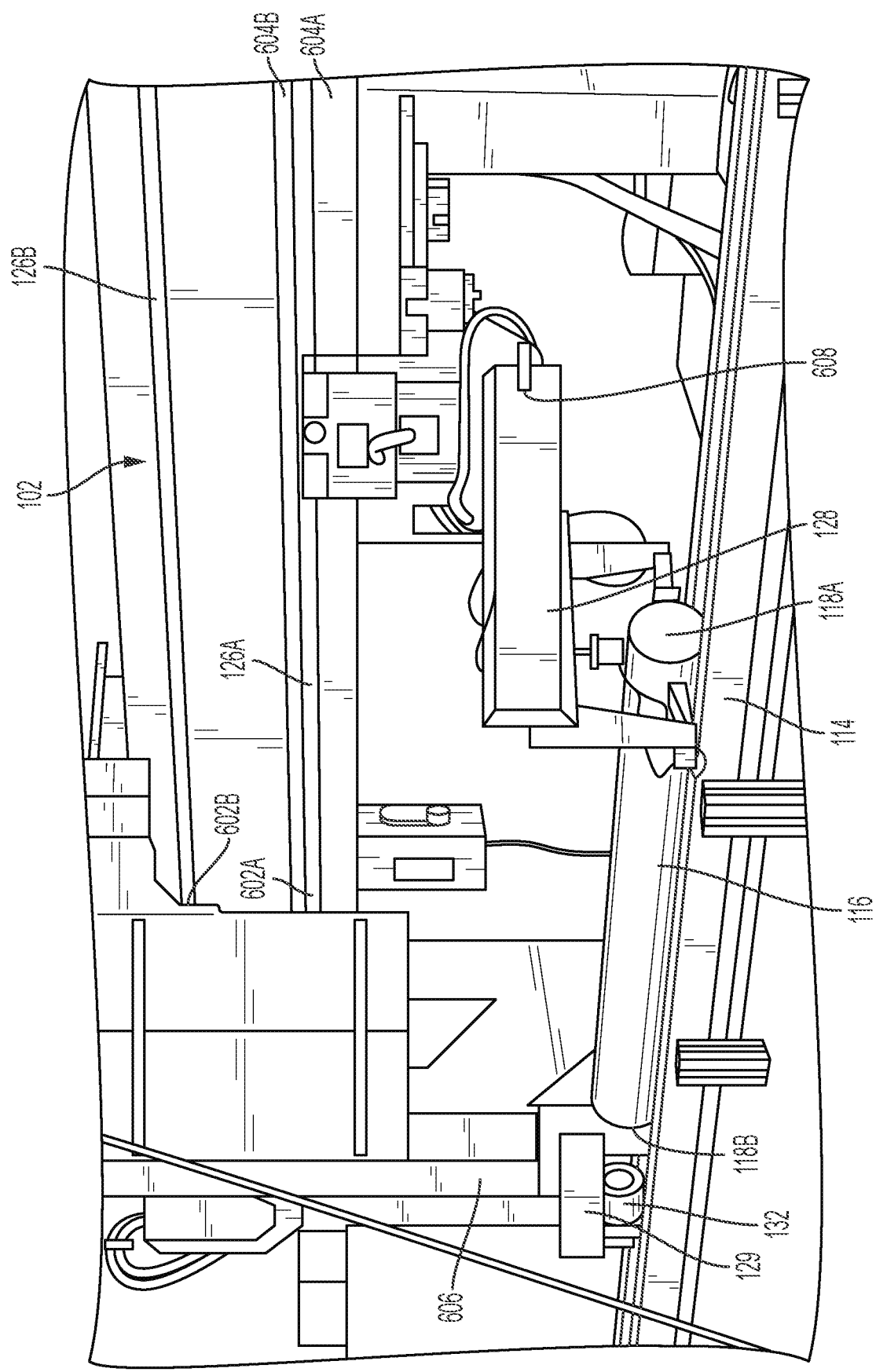
FIG. 6C is a perspective view of the head end assembly of FIG. 2 transferring control to the back end assembly of FIG. 3A with the head end assembly engaged with the leading end of the green ware at an end travel position, and with the back end assembly engaged with the back end of the green ware at an initial travel position.
Figure 6D:
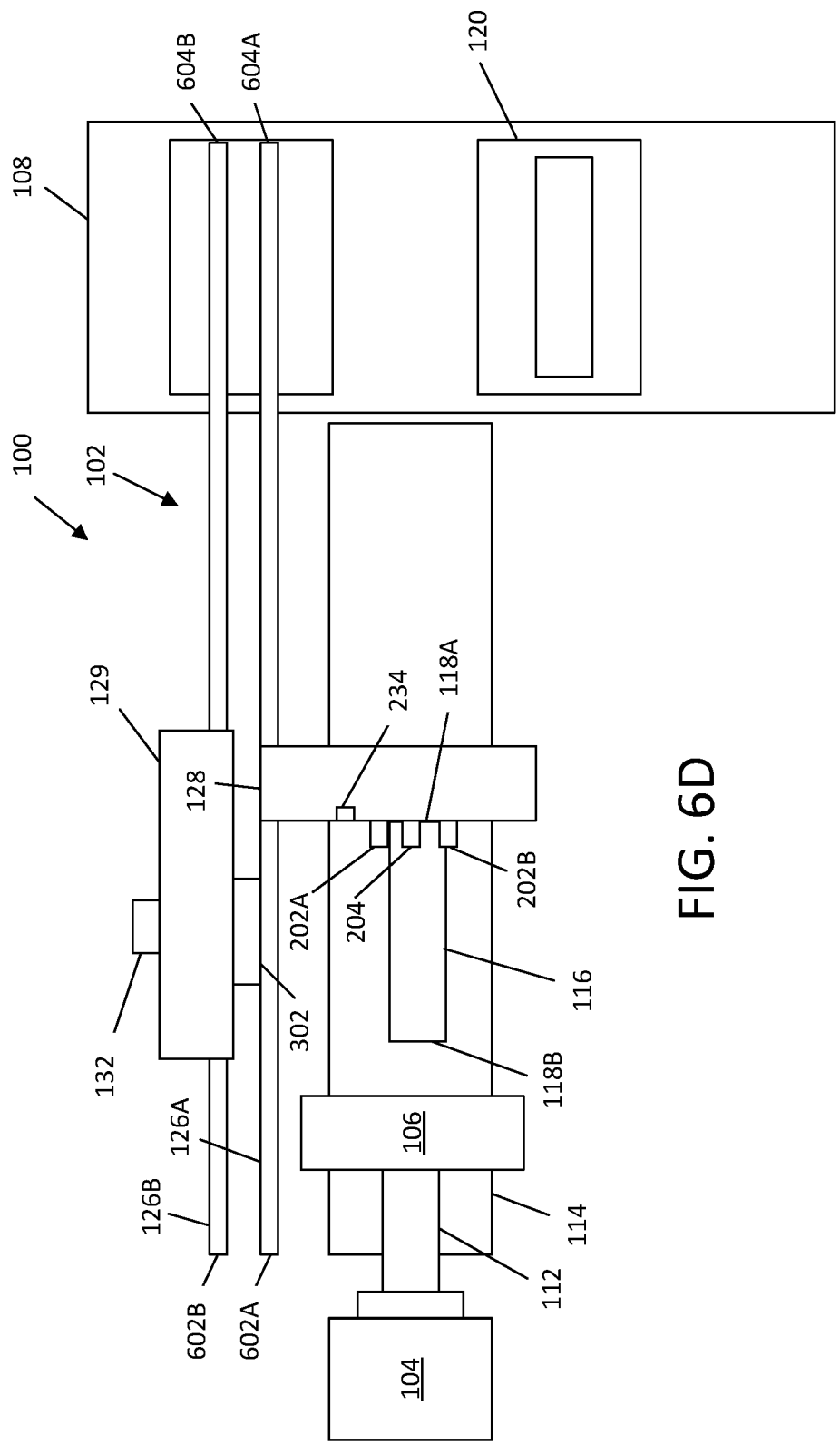
FIGS. 6D-6E are simplified schematics illustrating the features of FIG. 6C.
Figure 6E:
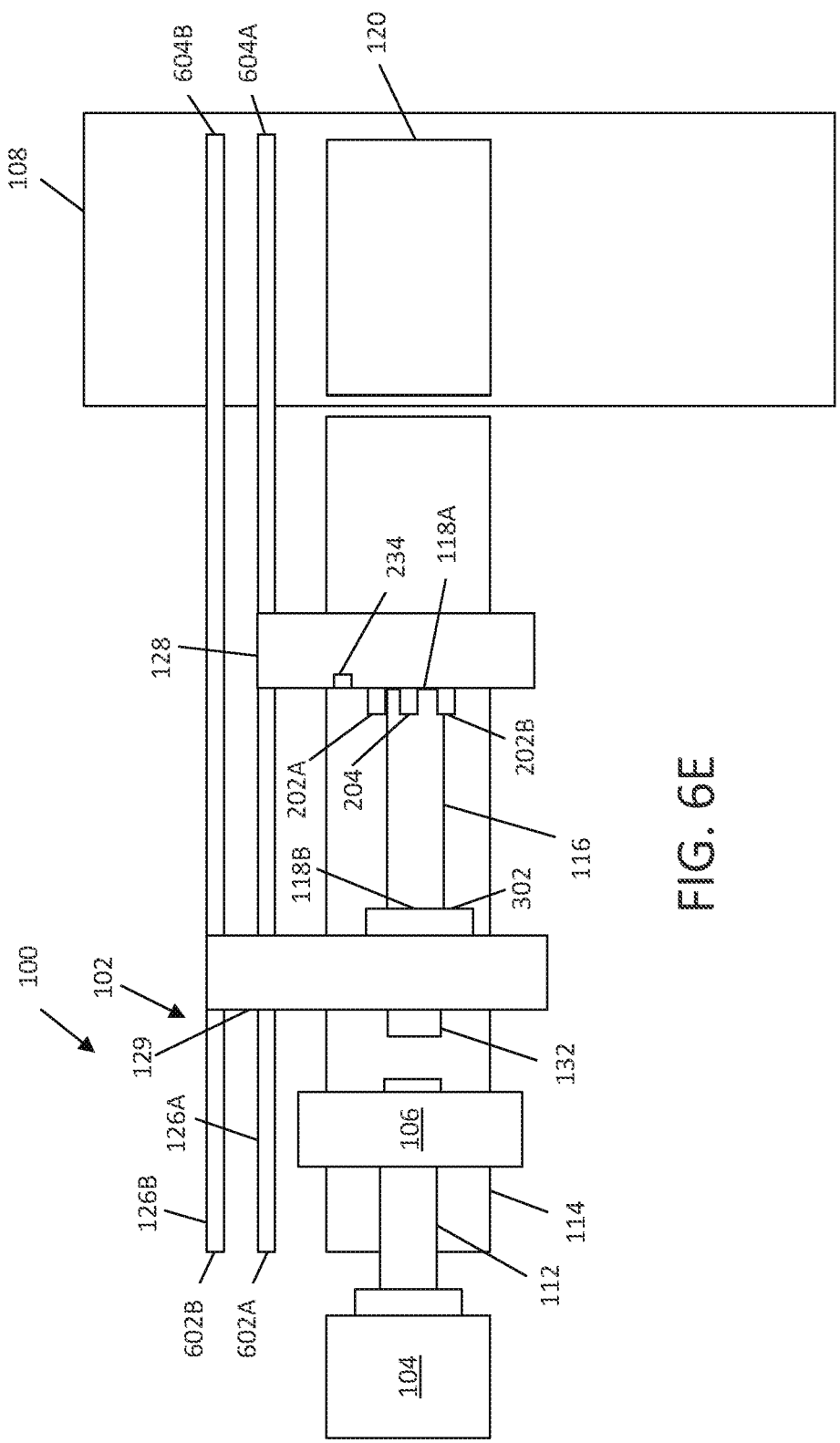

FIG. 6C is a perspective view of the head end assembly 128 transferring positional control to the back end assembly 129. FIGS. 6D-6E are simplified schematics illustrating the features of FIG. 6C. The head end assembly 128 is engaged with the leading end 118A of the green ware 116 at an end travel position. The head end assembly 128 translates the green ware 116 to create a gap for the back end assembly 129 to insert itself. The back end assembly 129 is engaged with the back end 118B of the green ware 116 at an initial travel position. In other words, the back end assembly 129 is positioned between the saw assembly 106 and the head end assembly 128. The back end arm 606 is in a retracted position as the back end assembly 129 travels along the second horizontal track 126B past the head end assembly 128, and then the back end arm 606 moves from the retracted position to the extended position to position the rotational effector 302 between the saw assembly 106 and the green ware 116. The back end assembly 129 then moves toward the head end assembly 128 to contact the back end 118B of the green ware 116.

The head end assembly 128 and the back end assembly 129 may both control translation of the green ware 116 for a short time during translation of the green ware 116 along the support channel 114. Once the back end assembly 129 is fully engaged and in control of the green ware 116, the head end assembly 128 disengages the green ware 116. In particular, the left and right effectors 202A, 202B move from the extended position to the retracted position, thereby disengaging the left and right sides of the green ware 116. The vertical effector 204 prevents any accidental rotation of the green ware 116 while the side pins 222A, 222B of the left and right effectors 202A, 202B disengage the green ware 116. Once the left and right effectors 202A, 202B are disengaged, the green ware 116 falls and thereby disengages the top pins 228 of the vertical effector 204. In this way, the top pins 228 of the vertical effector 204 serve as a guide to maintain the rotational orientation of the green ware 116 as the green ware 116 is lowered onto the support channel 114.

FIG. 6D illustrates the back end assembly 129 rotated (e.g., swiveled) out of the way of the head end assembly 128 for illustrative purposes. The back end assembly 129 may include a retractable arm and/or a swivel arm, etc. to avoid collision with the head end assembly 128 as it moves on the second horizontal track 126B past the head end assembly 128.

Figure 6F:
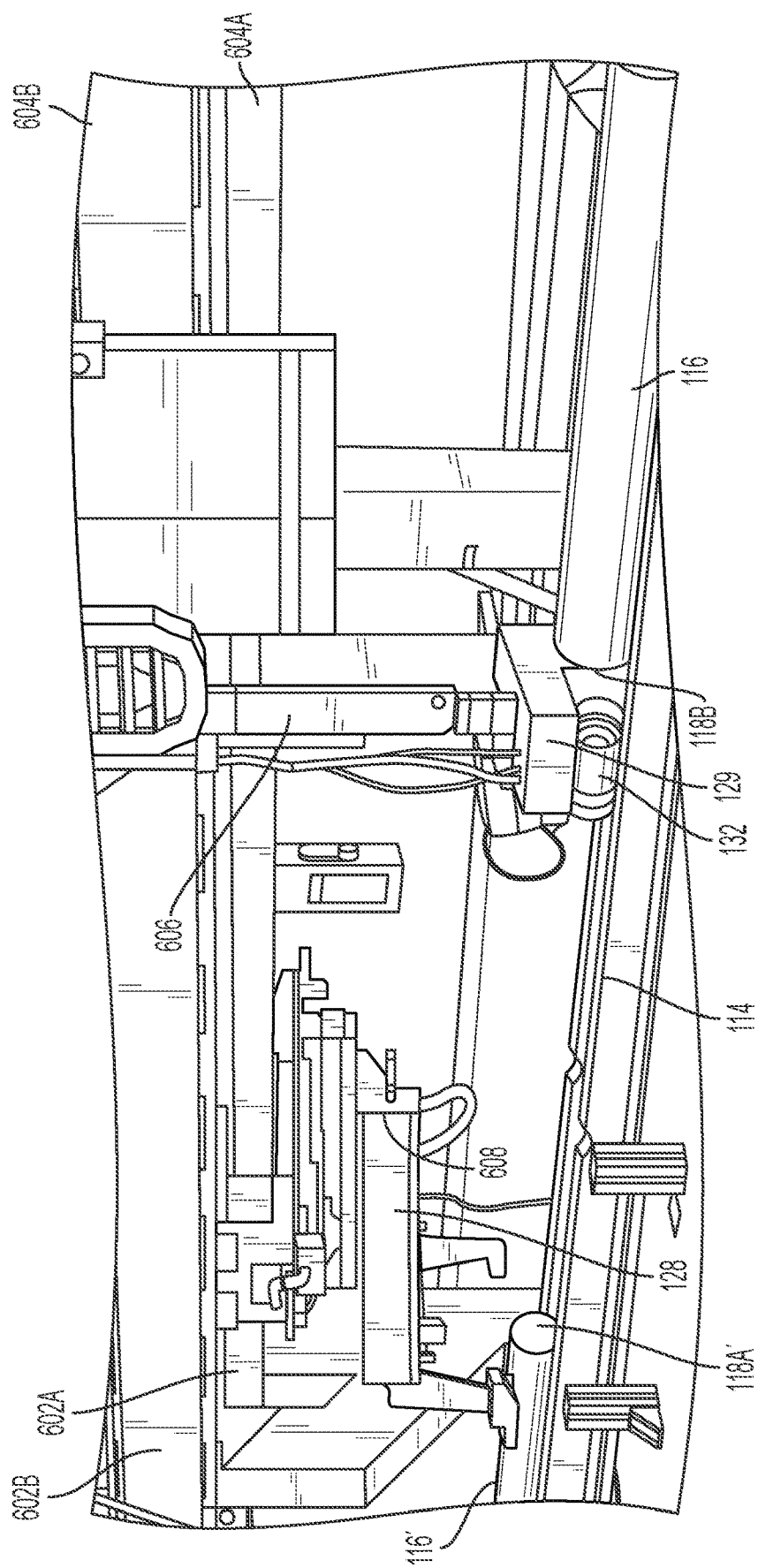
FIG. 6F is a perspective view of the back end assembly of FIG. 2 controlling the green ware with the head end assembly engaged with the leading end of a next green ware at an initial travel position, and with the back end assembly engaged with the back end of the green ware at an end travel position.
Figure 6G:
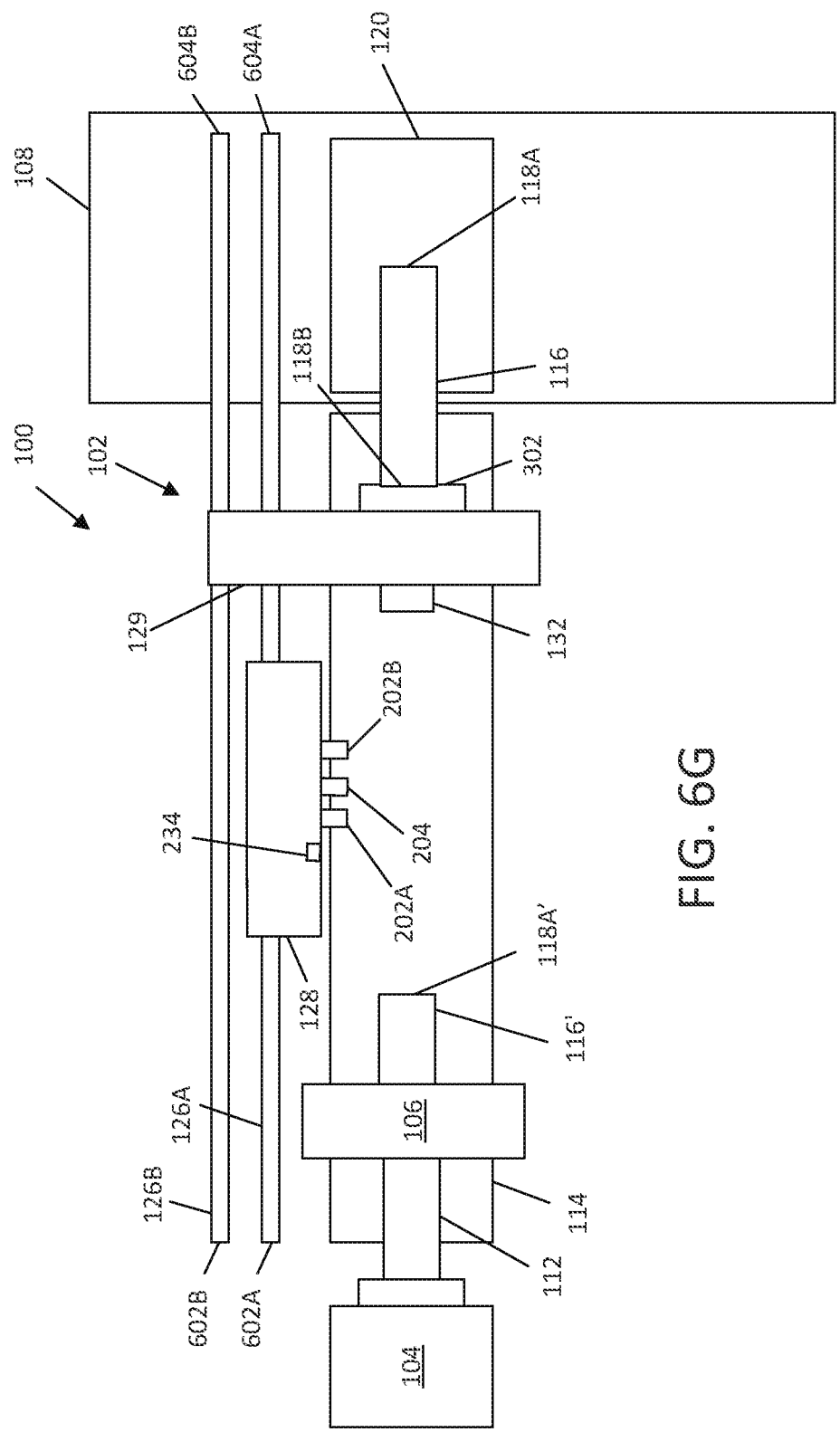
FIGS. 6G-6H are simplified schematics illustrating the features of FIG. 6F.
Figure 6H:
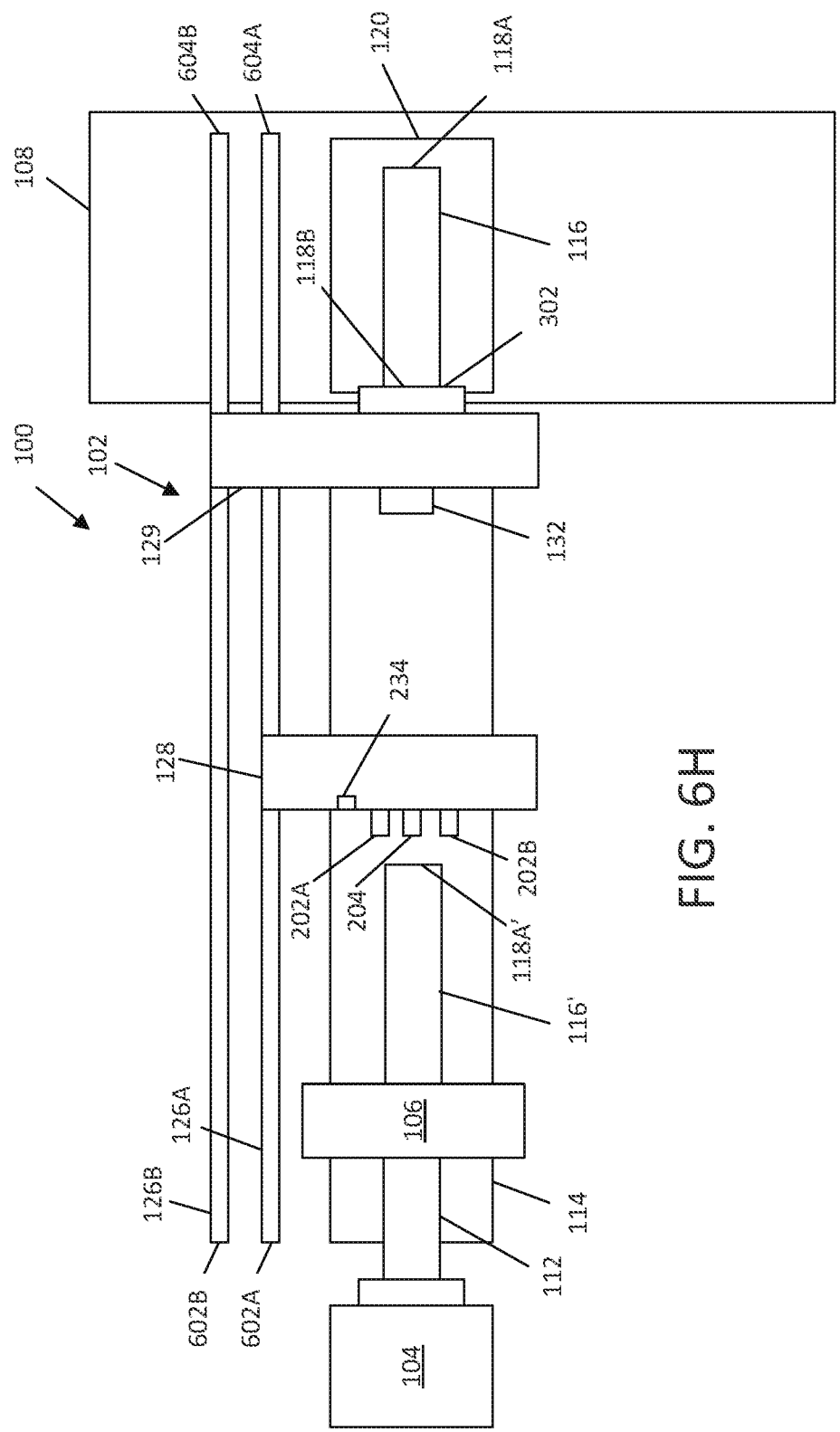

FIG. 6F is a perspective view of the back end assembly 129 of the green ware handling system 102 controlling the green ware 116. FIGS. 6G-6H are simplified schematics illustrating the features of FIG. 6F. The head end assembly 128 is engaged with the leading end 118A' of a next green ware 116' at an initial travel position. The head end assembly 128 may include a swivel arm 608 so that the head end assembly 128 may move past the back end assembly 129 and avoid collision therewith.

The back end assembly 129 is engaged with the back end 118B of the green ware 116 at an end travel position. The back end assembly 129 moves from the first end 604A of the second horizontal track 126B toward the second end 604B of the second horizontal track 126B. During translation of the green ware 116 toward the second end 604B of the second horizontal track 126B, the imaging device 132 images the back end 118B of the green ware 116, and generates at least one imaging output signal indicative of a rotational position of the back end 118B of the green ware 116. The imaging device 132 and/or a processing device (e.g., computer) electronically analyzes the imaging output signal of the imaging device 132. In particular, the web angle of the back end 118B (i.e., the rows and/or columns of the cross-sectional matrix) of the green ware 116 is analyzed with respect to a vertical and/or horizontal orientation (relative to gravity). The accuracy in analyzing the orientation of the green ware 116 is increased because the imaging device 132 directly views the back end 118B of the green ware 116 (as opposed to a surrogate-like reference line along an exterior of the green ware, which may have a high degree of positional variability and may not accurately reflect web angle).

The output signal (e.g., image) is analyzed by the imaging device 132 and/or processing device to detect any deviation of the matrix from a vertical and/or horizontal orientation (relative to gravity) and electronically generate a corrective solution. Further, in certain embodiments, the processing device electronically receives data from tray sensors (e.g., inclinometer) regarding leveling data of the dryer tray 120 (relative to gravity). The deviation of the dryer tray 120 (see FIGS. 1A-1B) from level is also incorporated into a corrective rotational solution of the green ware 116. The processing device evaluates the image from the imaging device 132 and/or the data from the tray sensors, and compares such data with a target range for alignment. In particular, the processing device compares the alignment of the cell structure of the back end 118B of the green ware 116 with a predetermined target alignment.

In certain embodiments, the back end assembly 129 rotates the green ware 116 (during translation thereof) based on the imaging device 132 and/or the tray sensors about a longitudinal axis A-A of the green ware 116 to vertically orient columns of the internal matrix of the green ware 116 relative to gravity, and/or to align a green ware web angle of the green ware 116 to a predetermined web angle relative to gravity. The green ware handling system 102 adjusts each green ware 116 and dryer tray 120 in combination for optimum accuracy. Further, web angle measurement data can be analyzed for trends, and additional inputs can be incorporated into the web angle corrective solution to further improve accuracy. In certain embodiments, after adjustment of the green ware 116, the imaging device 132 takes a second measurement to verify accuracy of the adjustment and/or for inclusion into future adjustment solutions. In certain embodiments, the green ware handling system 102 is configured to determine a difference between an average of a predetermined number of web angles to a desired target value, and generate additional input based on the difference for inclusion into a future web angle correction solution.

FIG. 6G illustrates the head end assembly 128 rotated (e.g., swiveled) out of the way of the back end assembly 129 for illustrative purposes. The head end assembly 128 may include a retractable arm and/or a swivel arm, etc. to avoid collision with the back end assembly 129 as it moves on the first horizontal track 126A past the back end assembly 129.

Figure 7:
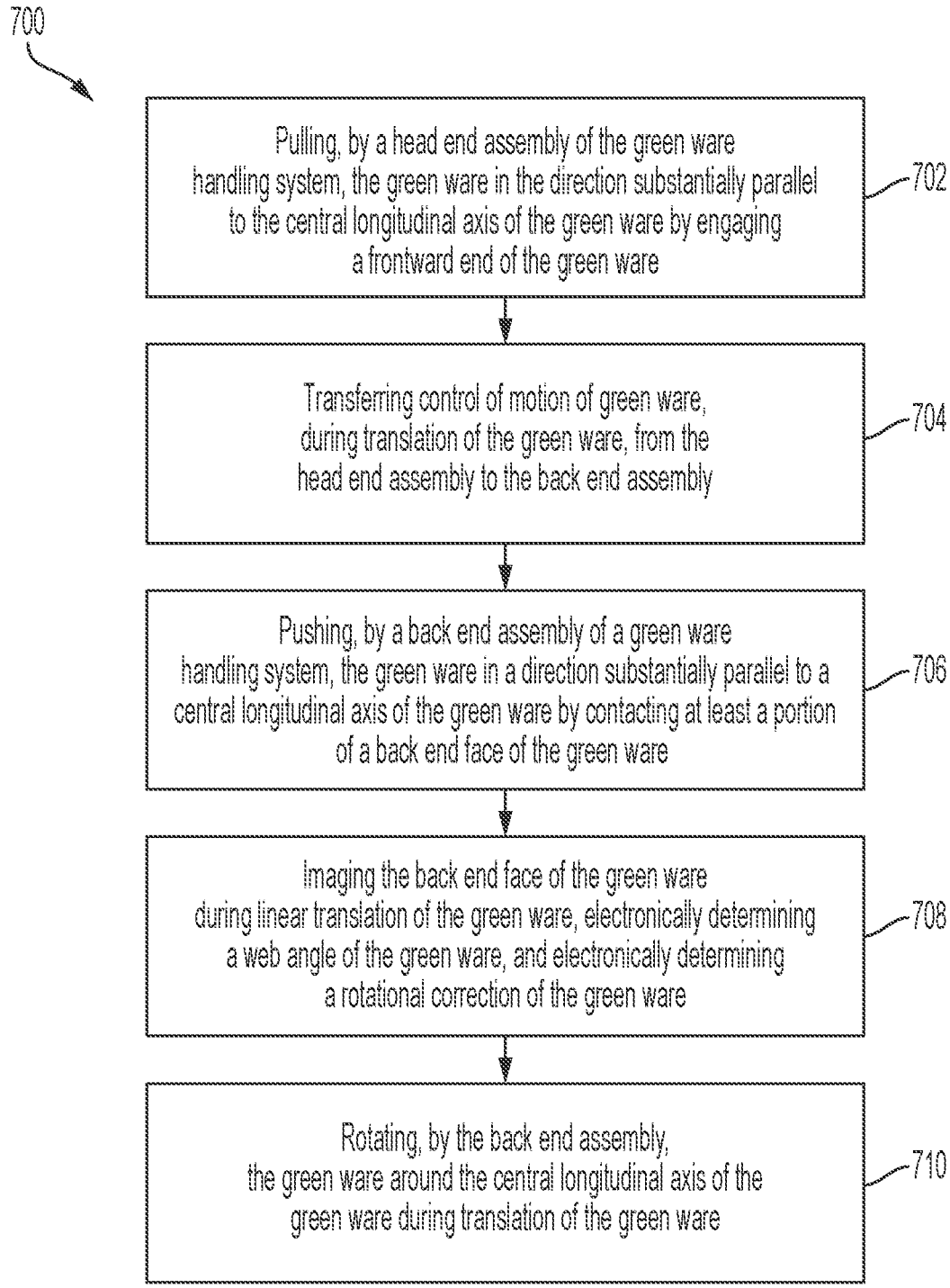
FIG. 7 is a flowchart illustrating steps for handling a green ware using the extrusion system of FIGS. 1A-1C.

FIG. 7 is a flowchart 700 illustrating steps for handling a green ware using the extrusion system of FIGS. 1A-1C. In step 702, the method includes pulling, by a head end assembly of the green ware handling system, the green ware in the direction substantially parallel to the central longitudinal axis of the green ware by engaging a leading end of the green ware. In step 704, the method includes transferring control of motion of the green ware, during translation of the green ware, from the head end assembly to the back end assembly. In certain embodiments, control of motion of the green ware transfers by penetrating the back end face of the green ware with a plurality of penetration features of a rotational effector of the back end assembly.

In step 706, the method includes pushing, by a back end assembly of a green ware handling system, a green ware in a direction substantially parallel to a central longitudinal axis of the green ware by contacting at least a portion of a back end face of the green ware. In step 708, the method includes imaging the back end face of the green ware during translation of the green ware, electronically determining a web angle of the green ware, and electronically determining a rotational correction of the green ware. In certain embodiments, the method further includes determining, by the green ware handling system, a difference between an average of a predetermined number of web angles to a desired target value, and generating, by the green ware handling system, additional input based on the difference for inclusion into a future web angle correction solution. In step 710, the method includes rotating, by the back end assembly, the green ware around the central longitudinal axis of the green ware during translation of the green ware. In certain embodiments, rotation of the green ware is responsive to the determined rotational correction. In certain embodiments, the rotation of the green ware includes rotating the green ware to align the web angle of the green ware to a predetermined web angle to vertically orient columns of an internal matrix of the green ware.

Figure 8A:
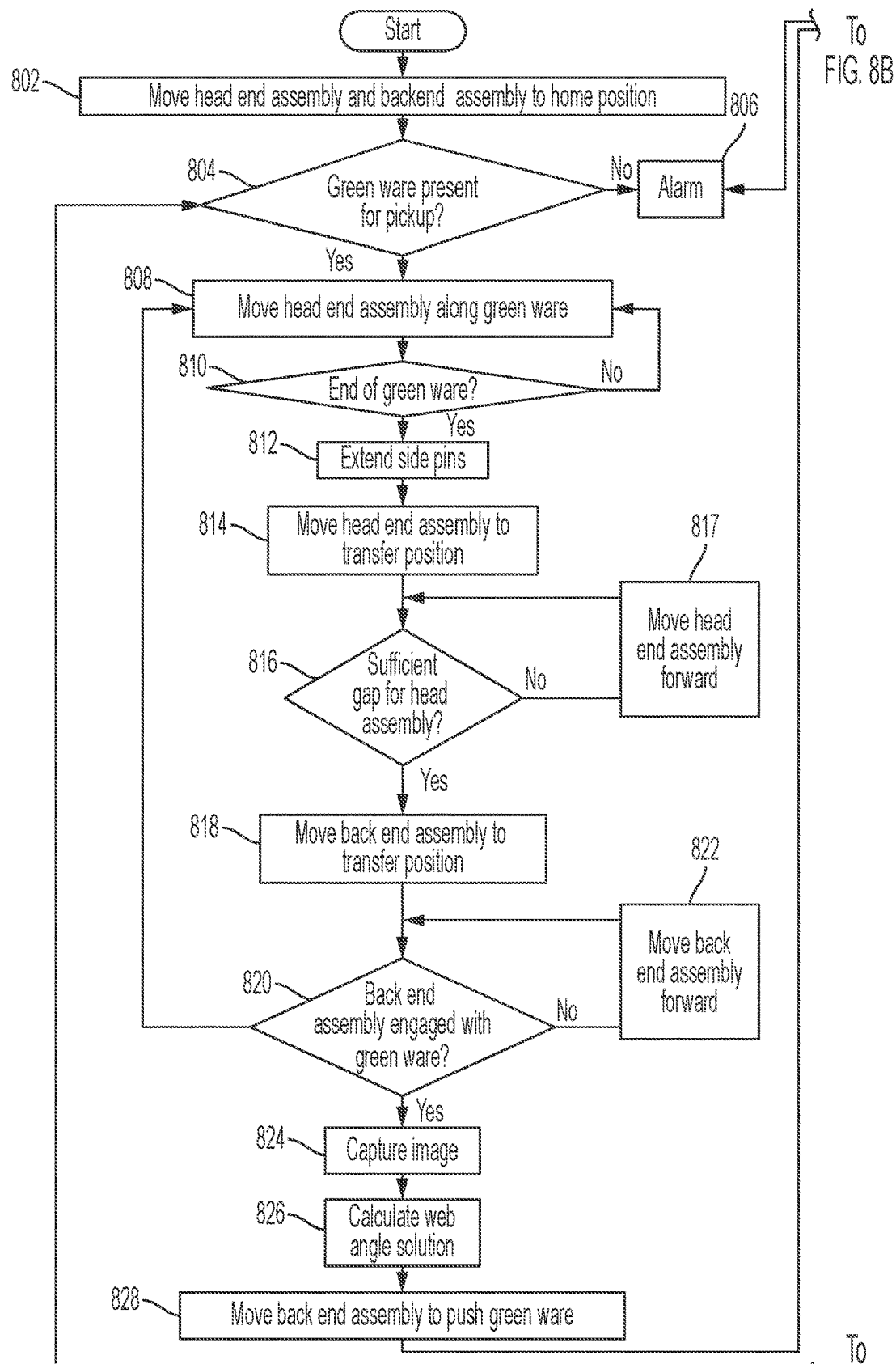
FIGS. 8A-8B, taken together, illustrate a flowchart 800 illustrating processing steps executed by a processor for handling a green ware using the green ware handling system of FIGS. 1A-1C.
Figure 8B:
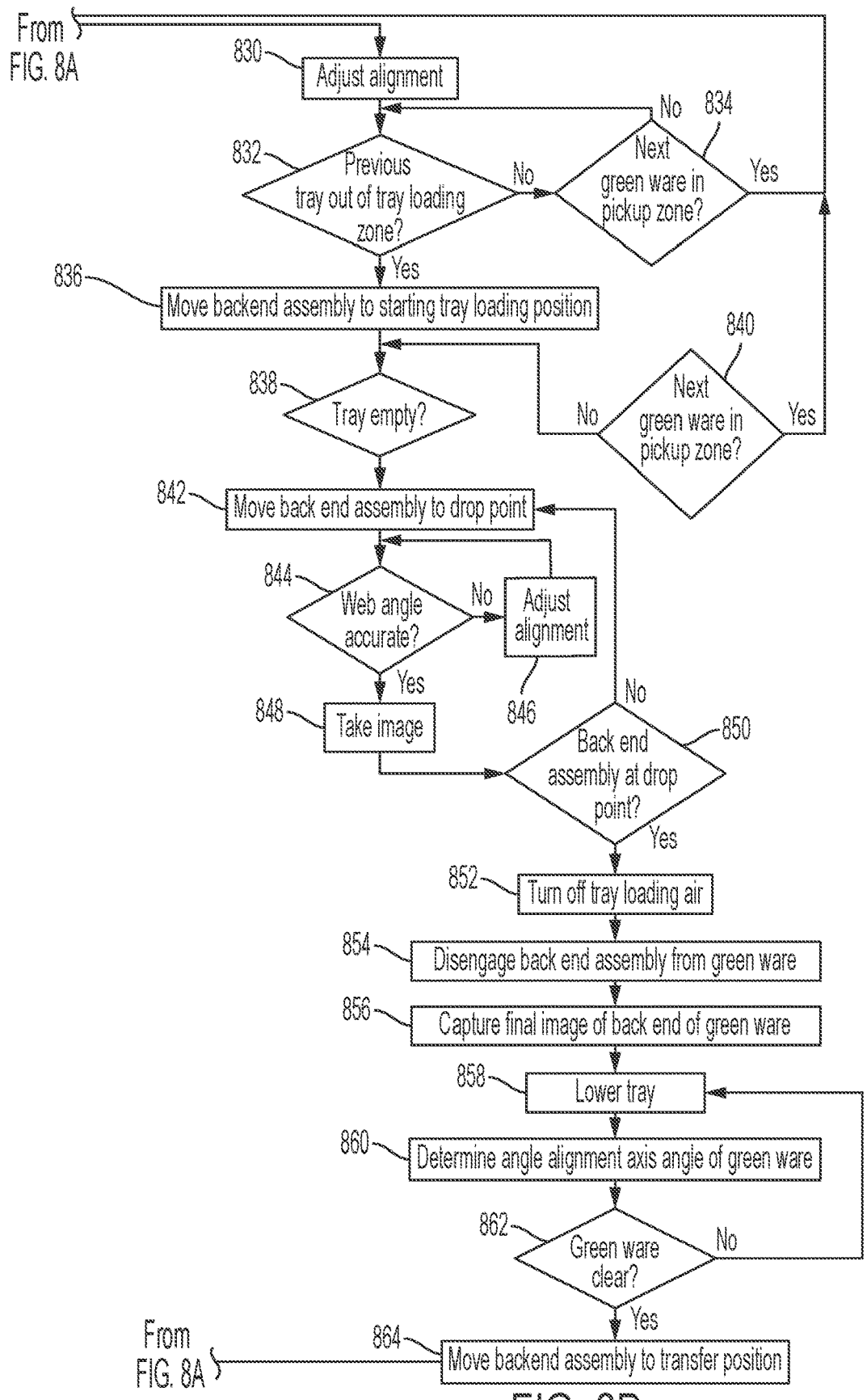

FIGS. 8A-8B, taken together, illustrate a flowchart 800 illustrating processing steps executed by a processor for handling a green ware using the green ware handling system of FIGS. 1A-1C. Step 802 includes moving a head end assembly and a back end assembly to home positions. In certain embodiments, the home position of the head end assembly is proximate an output of the saw assembly 106. Step 804 includes determining whether a green ware is present for pick up. If a negative determination is made in step 804, then step 806 includes sounding an alarm. If a positive determination is made in step 804, then step 808 includes moving the head end assembly along a length of the green ware. Step 810 includes determining whether the head end assembly is at an end of the green ware. If a negative determination is made in step 810, then step 808 is repeated. Accordingly, the head end assembly continues moving until the head end assembly reaches an end of the green ware. If a positive determination is made in step 810, then step 812 includes extending side pins into the green ware.

Step 814 includes moving the head end assembly to a head end transfer position to transfer control of the green ware to a back end assembly. Step 816 includes determining whether there is a sufficient gap for the back end assembly to position itself between the back end of the green ware and the incoming end of the next green ware. If a negative determination is made in step 816, then step 817 includes moving the head end assembly forward, and step 816 is repeated. Accordingly, the head end assembly continues to move until there is a sufficient gap for insertion of the back end assembly.

Step 818 includes moving the back end assembly to a back end transfer position between the back end of the green ware and the incoming end of the next green ware. Step 820 includes determining whether the back end assembly has engaged the green ware at the back end thereof. If a negative determination is made in step 820, then step 822 includes moving the back end assembly forward, and step 820 is repeated. Accordingly, the back end assembly continues to move until the back end assembly engages the green ware at a back end thereof.

Step 824 includes capturing an image of the back end of the green ware. In certain embodiments, an image of the back end of the green ware is captured by a camera attached to or part of the back end assembly. In certain embodiments, an image is captured at a leading end of the green ware instead. Step 826 includes calculating a web angle solution based on the captured image. Step 828 includes pushing the green ware by the back end assembly. Step 830 includes adjusting alignment based on the web angle solution. Thus, the processor rotates the green ware to adjust the web angle while translating the green ware.

Step 832 includes a determination as to whether a previous tray is out of a tray loading zone. If the determination is negative, in step 834, a determination is made as to whether a next green ware is in the pick-up zone. If a positive determination is made, the process proceeds to step 806 and an alarm is sounded. If a negative determination is made, the process reverts to step 832, and another determination is made as to whether a previous tray is out of the tray loading zone.

If a positive determination is made in step 832, then step 836 includes moving the back end assembly to a starting tray loading position. In step 838, a determination is made as to whether the tray is empty. If the determination is negative, in step 840, a determination is made as to whether a next green ware is in the pick-up zone. If a positive determination is made, the process proceeds to step 806 and an alarm is sounded. If a negative determination is made, the process reverts to step 838, and another determination is made as to whether the tray is empty.

If a positive determination is made in step 838, then step 842 includes moving back end assembly toward drop point. Step 844 includes determining whether the web angle is accurate. If a negative determination is made, then step 846 includes making further alignment adjustments, and then reverts to step 844. If a positive determination is made in step 844, then step 848 includes taking an image of an end of the back end of the green ware.

Step 850 includes determining if the back end assembly is at a drop point. If a negative determination is made, the process reverts to step 842. If a positive determination is made, then step 852 includes turning off the tray loading air. Step 854 includes disengaging the back end assembly from the green ware. Step 856 includes capturing a final image of the back end of the green ware.

Step 858 includes lowering the tray. Step 860 includes determining the angle alignment axis angle of the green ware. Step 862 includes determining whether the green ware is clear. If a negative determination is made, the process reverts to step 858. If a positive determination is made, then step 864 includes moving the back end assembly to the back end transfer position. Then the process reverts to step 804.

Figure 9:
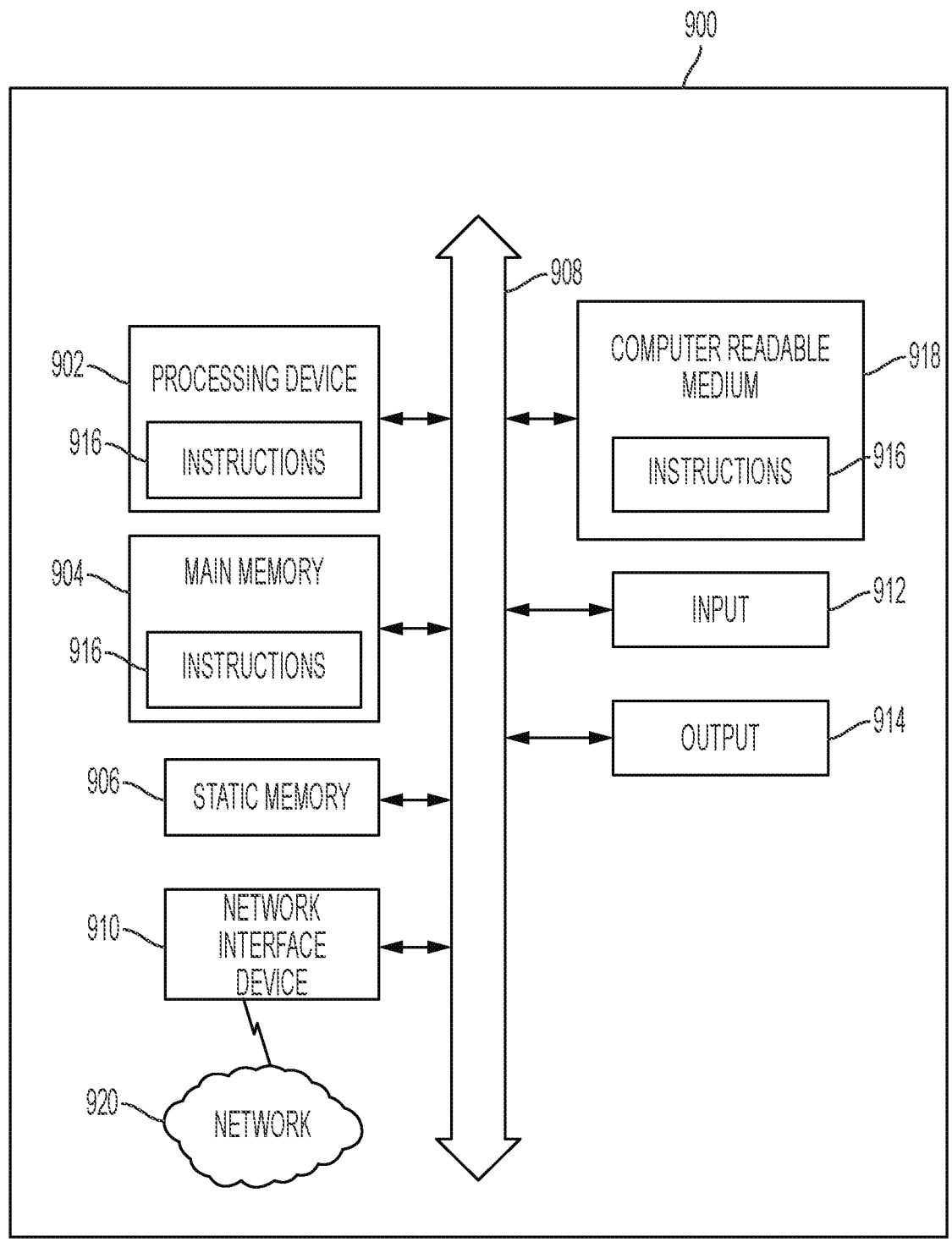
FIG. 9 is a schematic diagram of a generalized representation of a computer system that can be included in any component according to one embodiment.

FIG. 9 is a schematic diagram of a generalized representation of a computer system 900 that can be included in any component of the systems or methods disclosed herein. In this regard, the computer system 900 is adapted to execute instructions from a computer-readable medium to perform these and/or any of the functions or processing described herein.

In this regard, the computer system 900 in FIG. 9 may include a set of instructions that may be executed to program and configure programmable digital signal processing circuits for supporting scaling of supported communications services. The computer system 900 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 900 in this embodiment includes a processing device or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processing device 902 may be connected to the main memory 904 and/or static memory 906 directly or via some other connectivity means. The processing device 902 may be a controller, and the main memory 904 or static memory 906 may be any type of memory.

The processing device 902 represents one or more general-purpose processing devices, such as a microprocessor, central processing unit, or the like. More particularly, the processing device 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer readable medium 918. The instructions 916 may also reside, completely or at least partially, within the main memory 904 and/or within the processing device 902 during execution thereof by the computer system 900, the main memory 904 and the processing device 902 also constituting computer readable medium. The instructions 916 may further be transmitted or received over a network 920 via the network interface device 910.

While the computer readable medium 918 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer readable medium) having stored thereon instructions that may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or a similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems is disclosed in the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer readable medium and executed by a processor or other processing device, or combinations of both. The components of the system described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer readable medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the embodiments may be combined. Those of skill in the art will also understand that information and signals may be represented using any of a variety of technologies and techniques. For example, data, instructions, commands, information, signals, bits, symbols, and chips, which may be referenced throughout the above description, may be represented by voltages, currents, electromagnetic waves, magnetic fields, particles, optical fields, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A green ware handling system, comprising:
   a track; and
   a back end assembly mounted on the track and configured to contact at least a portion of a back end face of a green ware and push the green ware along a support channel, the back end assembly comprising a rotational effector configured to penetrate the back end face of the green ware, and, during translation of the green ware, rotate the green ware around a central longitudinal axis thereof.

2. The green ware handling system of claim 1, wherein:
   the green ware handling system further comprises a head end assembly movable along a second track and configured to engage a leading end of the green ware and pull the green ware along the support channel; and
   wherein the green ware handling system is configured to, during translation of the green ware along the support channel, transfer control of green ware motion from the head end assembly to the back end assembly.

3. The green ware handling system of claim 2, wherein the head end assembly comprises at least one fixed effector including a left fixed effector configured to engage a left side of the green ware and a right fixed effector configured to engage a right side of the green ware, the left fixed effector and the right fixed effector are-oriented toward one another, and each of the left fixed effector and the right fixed effector comprises at least one pin configured to extend at least partially into the green ware.

4. The green ware handling system of claim 1, wherein the back end assembly comprises a body translatable along the track and rotationally fixed relative to the track, the at least one rotational effector rotationally mounted to the body.

5. The green ware handling system of claim 1, wherein the rotational effector comprises a leading surface and a plurality of penetration features extending forward of the leading surface to penetrate the back end face of the green ware.

6. The green ware handling system of claim 1, wherein the plurality of penetration features includes penetration features circumferentially positioned around a center of the rotational effector, the penetration features comprising at least one of cleats, pins, or blades.

7. The green ware handling system of claim 1, wherein the plurality of penetration features comprises cleats circumferentially positioned around the center of the rotational effector, each cleat comprising a pyramid with a base, and each cleat oriented with one side of the base perpendicular to a radius extending from the center of the rotational effector.

8. The green ware handling system of claim 1, wherein the back end assembly further comprises:
a body, at least one imaging device mounted to the body, and the rotational effector mounted to the body, with the rotational effector comprising a ring defining a center hole, and
wherein the at least one imaging device is positioned behind the center hole and configured to image the back end face of the green ware through the center hole as the at least one imaging device translates concurrently with the back end face of the green ware.

9. The green ware handling system of claim 1, further comprising at least one imaging device configured to:
image the back face of the green ware; and
generate, during translation of the green ware, at least one imaging output signal indicative of a rotational position of the end face of the green ware; and
wherein the back end assembly is configured, during translation of the green ware, to rotate the green ware responsive to the at least one imaging output signal.

10. The green ware handling system of claim 1, wherein the back end assembly is configured to rotate the green ware to align a green ware-web angle of the green ware to a predetermined web angle to vertically orient columns of an internal matrix of the green ware.

11. The green ware handling system of claim 10, wherein the green ware handling system is configured to:
determine a difference between an average of a predetermined number of web angles to a desired target value; and
generate additional input based on the difference for inclusion into a future web angle correction solution.

12. A method of handling a green ware, comprising:
contacting at least a portion of a back end face of the green ware with a back end assembly of a green ware handling apparatus;
penetrating the back end face of the green ware with a plurality of penetration features of a rotational effector of the back end assembly; and
pushing the green ware with the back end assembly along a support channel in a direction substantially parallel to a central longitudinal axis of the green ware.

13. The method of claim 12, further comprising:
engaging a leading end of the green ware with a head end assembly of the green ware handling system; and
pulling the green ware along the support channel with the head end assembly.

14. The method of claim 13, further comprising transferring control of motion of the green ware from the head end assembly to the back end assembly during translation of the green ware.

15. The method of claim 12, further comprising rotating the green ware around the central longitudinal axis of the green ware with the back end assembly during translation of the green ware.

16. The method of claim 15, further comprising:
imaging the back end face of the green ware during translation of the green ware;
electronically determining a web angle of the green ware;
electronically determining a rotational correction of the green ware; and
wherein the rotating of the green ware is responsive to the determined rotational correction.

17. The method of claim 16, wherein the rotating of the green ware comprises aligning the web angle of the green ware to a predetermined web angle to vertically orient columns of an internal matrix of the green ware.

18. The method of claim 16, further comprising:
determining, by the green ware handling system, a difference between an average of a predetermined number of web angles to a desired target value; and
generating, by the green ware handling system, additional input based on the difference for inclusion into a future web angle correction solution.

19. The green ware handling system of claim 1, wherein the back end assembly comprises at least one imaging device configured to image the back end face of the green ware.

20. The green ware handling system of claim 1, wherein the support channel comprises an air bearing.

* * * * *